(12) United States Patent
Park et al.

(10) Patent No.: US 9,483,120 B2
(45) Date of Patent: *Nov. 1, 2016

(54) METHOD AND APPARATUS FOR CONTROLLING HAPTIC FEEDBACK OF AN INPUT TOOL FOR A MOBILE TERMINAL

(71) Applicant: Samsung Electronics Co., Ltd., Gyeonggi-do (KR)

(72) Inventors: Jin-Hyoung Park, Gangwon-do (KR); Ju-Youn Lee, Gyeonggi-do (KR); Sang-Hyup Lee, Gyeonggi-do (KR)

(73) Assignee: Samsung Electronics Co., Ltd (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/000,669

(22) Filed: Jan. 19, 2016

(65) Prior Publication Data

US 2016/0132118 A1 May 12, 2016

Related U.S. Application Data

(63) Continuation of application No. 14/107,491, filed on Dec. 16, 2013, now Pat. No. 9,239,622.

(30) Foreign Application Priority Data

Dec. 14, 2012 (KR) .................. 10-2012-0146773

(51) Int. Cl.
*G06F 3/041* (2006.01)
*G06F 3/01* (2006.01)
*G06F 3/0354* (2013.01)
*G06F 3/038* (2013.01)
*G06F 3/0488* (2013.01)
*H04M 1/725* (2006.01)

(52) U.S. Cl.
CPC .............. *G06F 3/016* (2013.01); *G06F 3/038* (2013.01); *G06F 3/0386* (2013.01); *G06F 3/03545* (2013.01); *G06F 3/0416* (2013.01); *G06F 3/0488* (2013.01); *G06F 2203/04106* (2013.01); *G06F 2203/04108* (2013.01); *H04M 1/7253* (2013.01); *H04M 2250/22* (2013.01)

(58) Field of Classification Search
None
See application file for complete search history.

(56) References Cited

U.S. PATENT DOCUMENTS

| 9,239,622 | B2* | 1/2016 | Park ................ G06F 3/016 |
| 2008/0024459 | A1 | 1/2008 | Poupyrev et al. |
| 2008/0150911 | A1 | 6/2008 | Harrison |
| 2009/0135164 | A1 | 5/2009 | Kyung et al. |

(Continued)

FOREIGN PATENT DOCUMENTS

| JP | 2006-012184 | 1/2006 |
| KR | 10-1180218 | 9/2012 |
| KR | 1020130136186 | 12/2013 |

OTHER PUBLICATIONS

European Search Report dated Aug. 4, 2016 issued in counterpart application No. 13861594.3-1959, 9 pages.

*Primary Examiner* — Muhammad N Edun
(74) *Attorney, Agent, or Firm* — The Farrell Law Firm, P.C.

(57) ABSTRACT

An apparatus and method are provided for controlling haptic feedback of an input tool for a mobile terminal. The method includes detecting, by the mobile terminal, a hovering of the input tool over an object displayed on a touch screen display of the mobile terminal; identifying a property of the object; and transmitting, to the input tool, a control signal for haptic feedback corresponding to the property of the object.

20 Claims, 22 Drawing Sheets

(56) References Cited

U.S. PATENT DOCUMENTS

| | | |
|---|---|---|
| 2010/0207746 A1 | 8/2010 | Song et al. |
| 2012/0120002 A1 | 5/2012 | Ota |
| 2012/0127088 A1 | 5/2012 | Pance et al. |
| 2013/0127755 A1 | 5/2013 | Lynn et al. |
| 2014/0002386 A1 | 1/2014 | Rosenberg et al. |

* cited by examiner

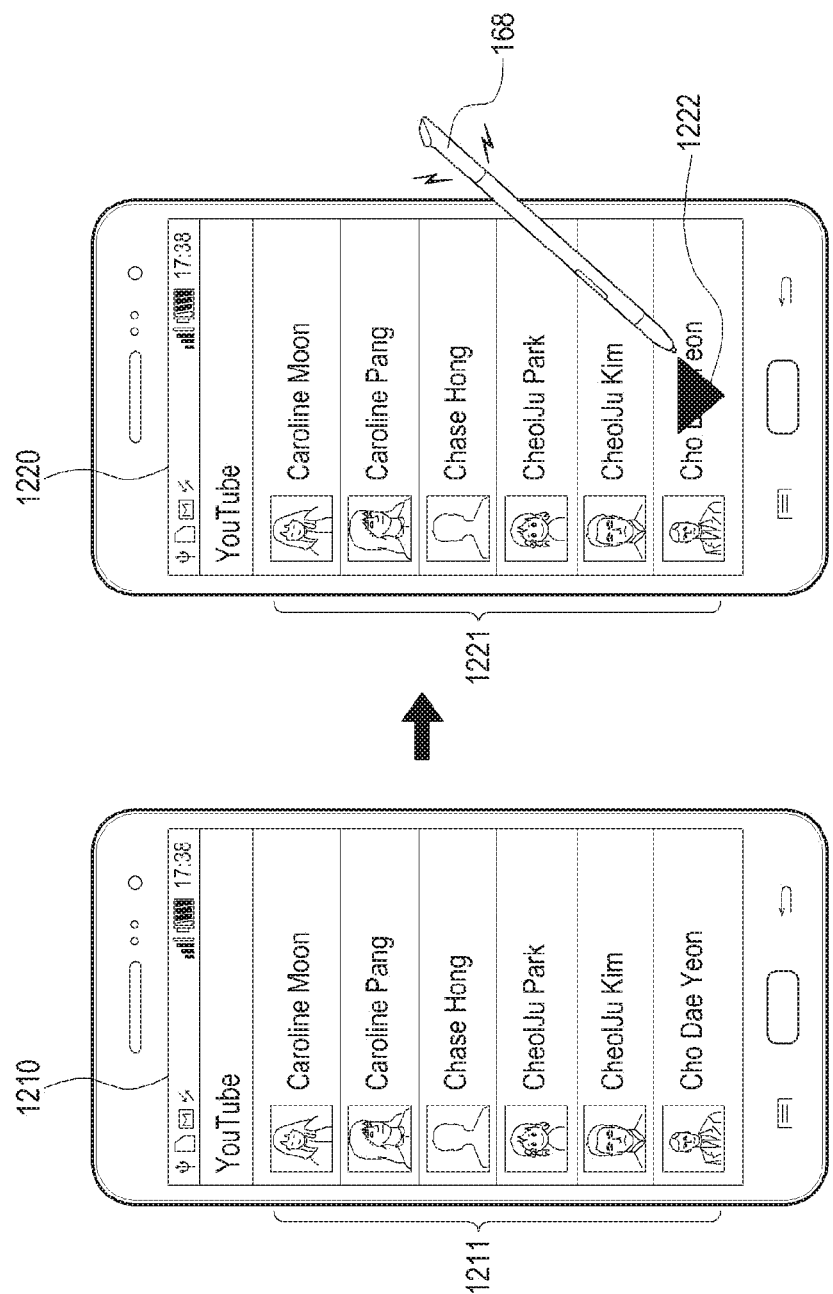

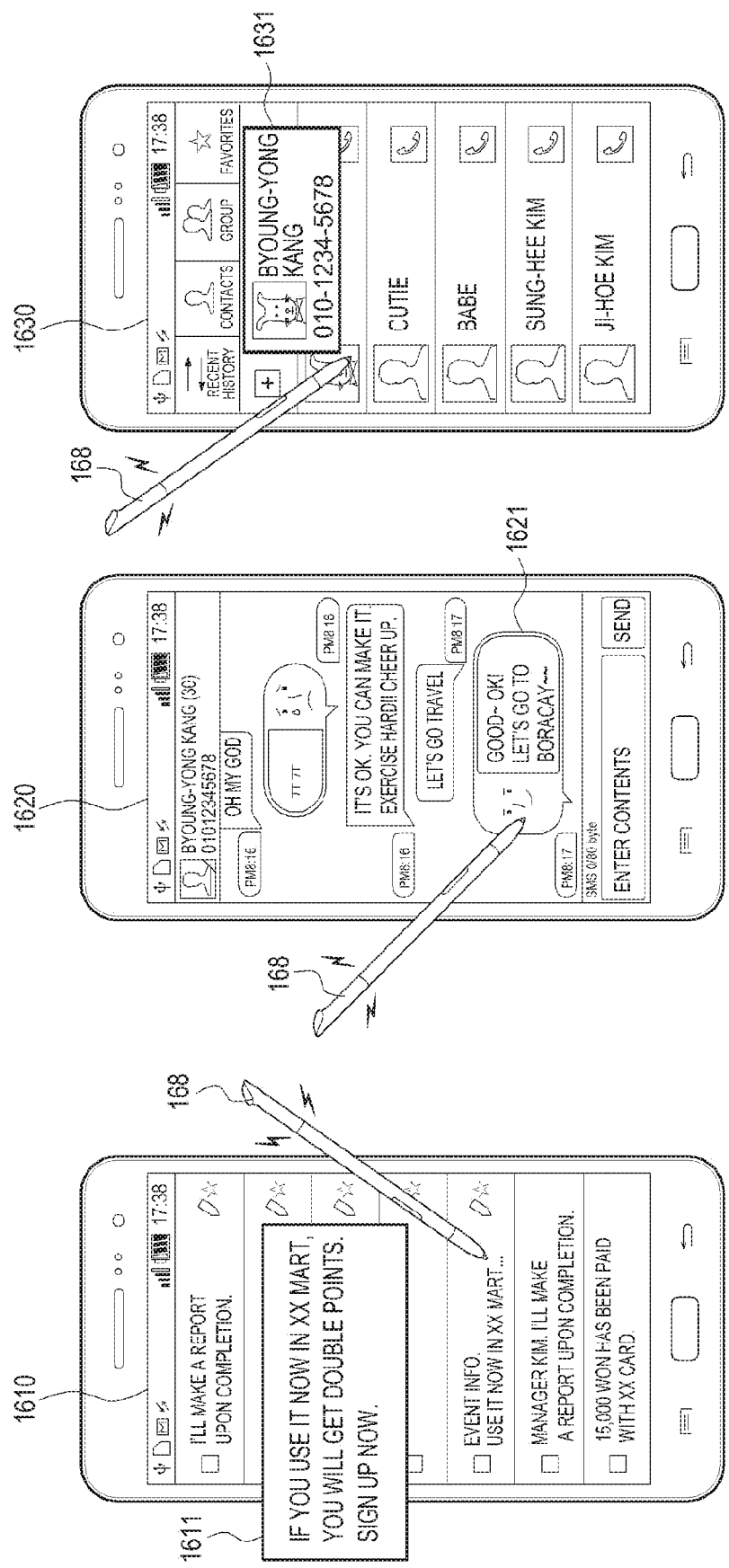

METHOD AND APPARATUS FOR CONTROLLING HAPTIC FEEDBACK OF AN INPUT TOOL FOR A MOBILE TERMINAL

PRIORITY

This application is a Continuation application of U.S. patent application Ser. No. 14/107,491, which was filed in the U.S. Patent and Trademark Office on Dec. 16, 2013, and claims priority under 35 U.S.C. §119(a) to Korean Patent Application Serial No. 10-2012-0146773, which was filed in the Korean Intellectual Property Office on Dec. 14, 2012, the entire content of each of which is incorporated herein by reference.

BACKGROUND OF THE INVENTION

1. Field of the Invention

The present invention relates generally to an apparatus and method for controlling haptic feedback.

2. Description of the Related Art

Mobile terminals having touch screens generally utilize a touch input method that uses a user's fingertip or an input tool, such as an electronic pen or a stylus pen. For example, touch input methods include a contact-type touch input method in which an input actually contacts the touch screen, and a noncontact-type touch input method in which an input is received when the user's finger or pen is placed within a predetermined distance of the touch screen, e.g., a hovering input method.

Recently, improved touch input methods have been used, which generate haptic feedback, e.g., vibrations using a vibration device, when a user makes a touch input on a touch screen, allowing the user to feel a sense of manipulating buttons.

However, these improved touch input methods merely allow the user to recognize the actual contact of an input tool with the touch screen, and thus, have limitations with conveying a sense of manipulating (or enjoying) applications to the user.

SUMMARY OF THE INVENTION

The present invention is designed to address at least the above-mentioned problems and/or disadvantages and to provide at least the advantages described below.

Accordingly, an aspect of the present invention provides a method and mobile terminal including a touch screen that control haptic feedback of an input tool.

In accordance with an aspect of the present invention, a method is provided for controlling haptic feedback of an input tool in a mobile terminal. The method includes detecting, by the mobile terminal, a hovering of the input tool over an object displayed on a touch screen display of the mobile terminal; identifying a property of the object; and transmitting, to the input tool, a control signal for haptic feedback corresponding to the property of the object.

In accordance with another aspect of the present invention, a mobile terminal is provided that controls haptic feedback of an input tool. The mobile terminal includes a touch screen configured to display objects; a controller configured to detect hovering of the input tool over the touch screen display, to determine an object associated with the hovering of the input tool, and to generate a control signal for haptic feedback corresponding to a property of the object; and a transceiver for transmitting the control signal to the input tool.

In accordance with another aspect of the present invention, a method for providing haptic feedback of an input tool in a mobile terminal is provided. The method includes storing, by the mobile terminal, different haptic feedback patterns for different properties of objects; detecting the input tool hovering over an object displayed by the mobile terminal; analyzing properties of the object; displaying a preview image including at least one of details of the object, metadata for the object, and a zoomed image of the object; and controlling vibration of the mobile terminal depending on a haptic feedback pattern that is set for the object.

In accordance with another aspect of the present invention, an input tool is provided for a touch screen device. The input tool includes a vibration device; a short-range communication unit for receiving a control signal from a mobile terminal, in response to the input tool hovering over the mobile terminal; and a haptic controller for controlling the vibration device based on the control signal. The control signal controls at least one of activation of the vibration device, inactivation of the vibration device, a vibration cycle of the vibration device, and a vibration strength of the vibration device, depending on a property of an object displayed on the mobile terminal over which the hovering is detected.

In accordance with another aspect of the present invention, a method for providing haptic feedback in an input tool is provided. The method includes hovering the input tool over an object displayed on a mobile terminal; receiving, from the mobile terminal, a control signal corresponding to a property of the object; and controlling a vibration device of the input tool based on the control signal. The control signal includes at least one of information for activating the vibration device, information for inactivating the vibration device, a vibration cycle of the vibration device, and a vibration strength of the vibration device.

BRIEF DESCRIPTION OF THE DRAWINGS

The above and other aspects, features, and advantages of certain embodiments of the present invention will be more apparent from the following description taken in conjunction with the accompanying drawings, in which:

FIGS. 12A and 12B illustrate an example in which hovering indicates scrolling down though multiple objects according to an embodiment of the present invention;

FIGS. 16A to 16C illustrate an example of displaying content associated with an object as a preview image according to an embodiment of the present invention.

Throughout the drawings, the same drawing reference numerals will be understood to refer to the same elements, features and structures.

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of certain embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Figure 1:
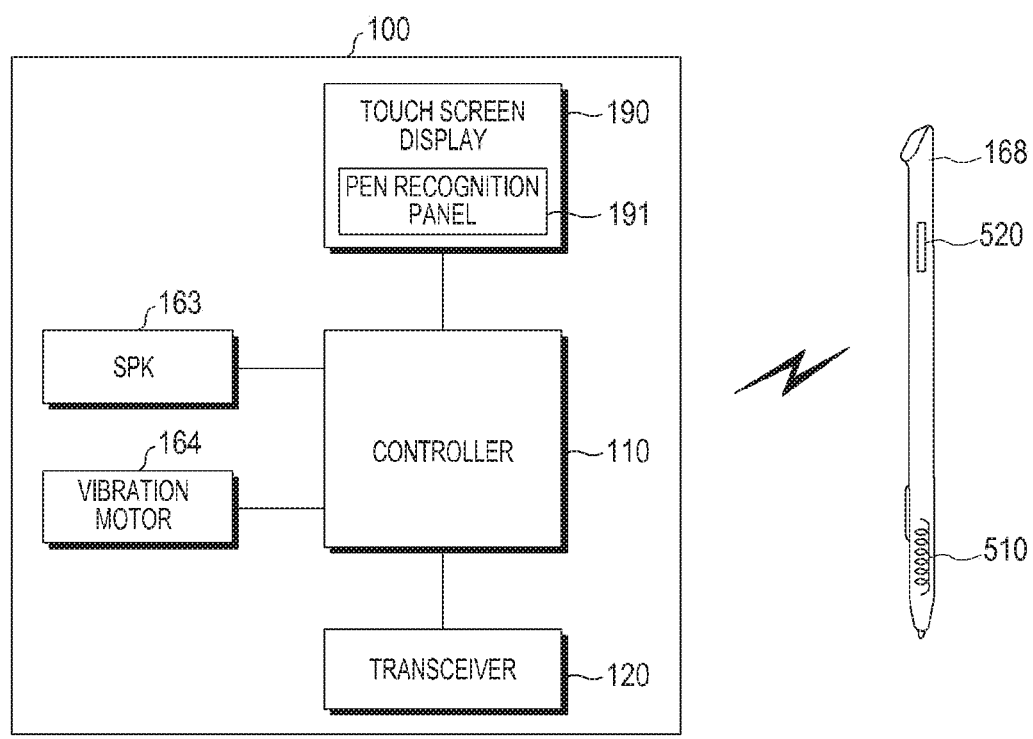
FIG. 1 is a block diagram illustrating a mobile terminal according to an embodiment of the present invention.

FIG. 1 is a block diagram illustrating a mobile terminal according to an embodiment of the present invention. Specifically, FIG. 1 illustrates a mobile terminal 100 that communicates with an input tool 168 in order to provide haptic feedback to a user through the input tool 168.

Referring to FIG. 1, a mobile terminal 100 includes a touch screen display 190, a controller 110, a speaker 163, a transceiver 120 for communicating with an input tool 168, e.g., a stylus pen, that is used in conjunction with the touch screen display 190, and a vibration motor 164 for providing haptic feedback within the mobile terminal 100.

Although not illustrated in FIG. 1, the mobile terminal 100 may include other elements such as a mobile communication module, a camera, a GPS, a keypad, etc. However, because these elements are not specifically related to the provision of haptic feedback, these elements are not described herein.

For example, the controller 110 includes a Central Processing Unit (CPU), a Read Only Memory (ROM) in which control programs for control of the mobile terminal 100 is stored, and a Random Access Memory (RAM) used as a storage area for storing signals or data received from the outside of the mobile terminal 100 and for executing the operations performed in the mobile terminal 100.

The controller 110 controls the overall operation of the mobile terminal 100. More specifically, the controller 110 determines if hovering of the input tool 168 is detected over any object displayed on the touch screen 190, and identifies an object corresponding to a position where the hovering has occurred. The controller 110 may detect a height from the touch screen 190 to the input tool 168, and a hovering input event associated with the detected height.

For example, a hovering input event may be detected by an operation in which a button formed in the input tool 168 is pressed, an operation in which the input tool 168 is tapped, an operation in which the input tool 168 is moved faster than a predetermined speed, and an operation in which an object displayed on the touch screen display 190 is actually touched by the input tool 168.

Further, different haptic patterns may be set for different distances between the input tool 168 and the touch screen 190.

Upon detecting a hovering input event, the controller 110 displays a predetermined hovering input effect corresponding to the hovering input event on the touch screen 190. For example, to display the details of an object over which hovering is detected, the controller 110 checks if an airview function is activated, generates a preview image if the airview function is activated, and displays the details of the object in the preview image. The preview image may include details of the object, and also metadata that is entered in the object in advance, and/or a zoomed image of the object, depending on the type of the object.

Further, the controller 110 outputs a control signal associated with a predetermined haptic pattern corresponding to the identified object, to the input tool 168. The controller 110 also controls vibration of the mobile terminal 100 by controlling the vibration motor 164 depending on the predetermined haptic pattern corresponding to the identified object.

A predetermined haptic pattern may be set differently depending on the type of the object. For example, a haptic pattern may be set differently depending on whether an object is a video or an image, and on the genre of the video, if the object is video. In addition, if the type of an object is E-mail, an SMS message, an MMS message, or news item, a haptic pattern may be set differently depending on the importance of the content therein, or the field of the object. In this case, the importance may be determined by checking if a predetermined word is present in the object.

Upon receiving a control signal associated with the haptic pattern, the input tool 168 also generates vibrations corresponding to the control signal. Specifically, the input tool 168 receives a control signal associated with a haptic pattern from the mobile terminal 100, analyzes the received control signal, and outputs a haptic feedback to the user based on the analysis. As a result, the user may feel vibrations through the input tool 168 being held in the user's hand.

For example, the transceiver 120 may include at least one of the WLAN module and the short-range communication module supporting Bluetooth, Infrared Data Association (IrDA), WiFi-Direct, NFC, etc.

The controller 110 transmits the control signal associated with a haptic pattern to the input tool 168 through at least one of the WLAN module and the short-range communication module in the transceiver 120.

The speaker 163, under control of the controller 110, outputs sounds corresponding to various signals, e.g., radio signals, broadcast signals, digital audio files, digital video files, photo-shooting tones, etc. Additionally, the speaker 163 outputs sounds corresponding to the control signal that is provided to the input tool 168. For example, the sounds corresponding to the control signal may include a sound indicating activation of a vibration device 520 in the input tool 168, a sound indicating a change in level of vibration strength, and a sound indicating inactivation of the vibration device 520. The volume for these sounds may be controlled depending on the vibration strength of the vibration device 520 in the input tool 168, and the sounds may be output through the speaker 163 of the mobile terminal 100 and/or a speaker (not shown) which may be mounted in the input tool 168, upon activation of the vibration device 520 or at intervals of a predetermined time (for example 10 ms) before/after the activation. The sounds may be terminated upon inactivation of the vibration device 520 or at intervals of a predetermined time (for example 10 ms) before/after the inactivation. One or multiple speakers 163 may be formed in a proper position or positions of the housing of the mobile terminal 100.

The vibration motor 164 converts electrical signals into mechanical vibrations under control of the controller 110. For example, the vibration motor 164 operates, if the mobile terminal 100 receives a voice call from another device (not shown) in a vibration mode. One or multiple vibration motors 164 may be mounted in the housing of the mobile terminal 100. To provide haptic feedback in the mobile terminal 100, the vibration motor 164 operates in response to the user's touch action on the touch screen 190 and/or the continuous movement of a touch (or a drag action) on the touch screen 190.

The touch screen display 190 receives touch inputs by a user's body (for example, fingers) or by the input tool 168. Accordingly, the touch screen display 190 includes a pen recognition panel 191 that recognizes touch inputs entered by the input tool 168, such as a stylus pen and an electronic pen, and the pen recognition panel 191 may determine the distance between the input tool 168 and the touch screen 190 depending on the magnetic field. The touch screen 190 may receive a continuous movement of a touch among at least one touch. The touch screen 190 may transfers signals corresponding to the received continuous movement of a touch, to the controller 110.

In accordance with an embodiment of the present invention, the touch is not limited to actual contact between the touch screen 190 and the user's body or the input tool 168, and includes noncontact touches (with a contactless detectable gap of, for example, about 5 mm between the touch screen 190 and the user's body or the input tool 168), e.g., hovering. The gap detectable on the touch screen 190 is subject to change depending on the performance or structure of the mobile terminal 100, and the touch screen 190 is configured to output different detection values (for example, analog voltage or current values) for a touch event by the contact with the user's body or the input tool 168 and a noncontact touch event (for example, a hovering event), thereby making it possible to separately detect the touch event and the hovering event.

In accordance with an embodiment of the present invention, the touch screen 190 may output different detection values (for example, current values) depending on the gap between the touch screen 190 and the space where the hovering event occurs.

The touch screen 190 may be implemented in, for example, a resistive type, a capacitive type, an infrared type, or an acoustic wave type.

Further, the touch screen 190 may include at least two touch screen panels to separately detect the touch or the proximity of the user's body or the input tool 168 with/to the touch screen 190, thereby making it possible to sequentially or simultaneously receive the inputs by the user's body and the input tool 168. The at least two touch screen panels provide different output values to the controller 110, which may determine whether an input from the touch screen 190 is an input by the user's body or an input by the input tool 168, by recognizing the different values received from the at least two touch screen panels.

More specifically, the touch screen 190 may be formed in the structure where a panel for detecting an input by the fingertip or the input tool 168 depending on a change in induced electromotive force and a panel for detecting the contact of the fingertip or the input tool 168 with the touch screen 190 are stacked in sequence to be in contact with each other or to be partially spaced apart from each other. The touch screen 190 has a plurality of pixels to display images using the pixels. The touch screen 190 may employ any one of Liquid Crystal Display (LCD), Organic Light Emitting Diodes (OLED), and Light Emitting Diodes (LED).

The touch screen 190 includes multiple sensors that detect a position where a fingertip or the input tool 168 is in contact with the surface of the touch screen 190 or is placed within a specific distance from the touch screen 190. The multiple sensors may be formed in a coil structure, and in a sensor layer formed of multiple sensors, the sensors form a plurality of electrode lines in predetermined patterns. Using this structure, if a contact or a hovering input occurs on the touch screen 190 by the fingertip or the input tool 168, a detection signal is generated having a waveform that changes due to the capacity between the sensor layer and the input object, and the touch screen 190 transfers the generated detection signal to the controller 110. A specific distance between the input tool 168 and the touch screen 190 may be determined depending on the strength of the magnetic field formed by a coil 510 in the input tool 168.

Figure 2:
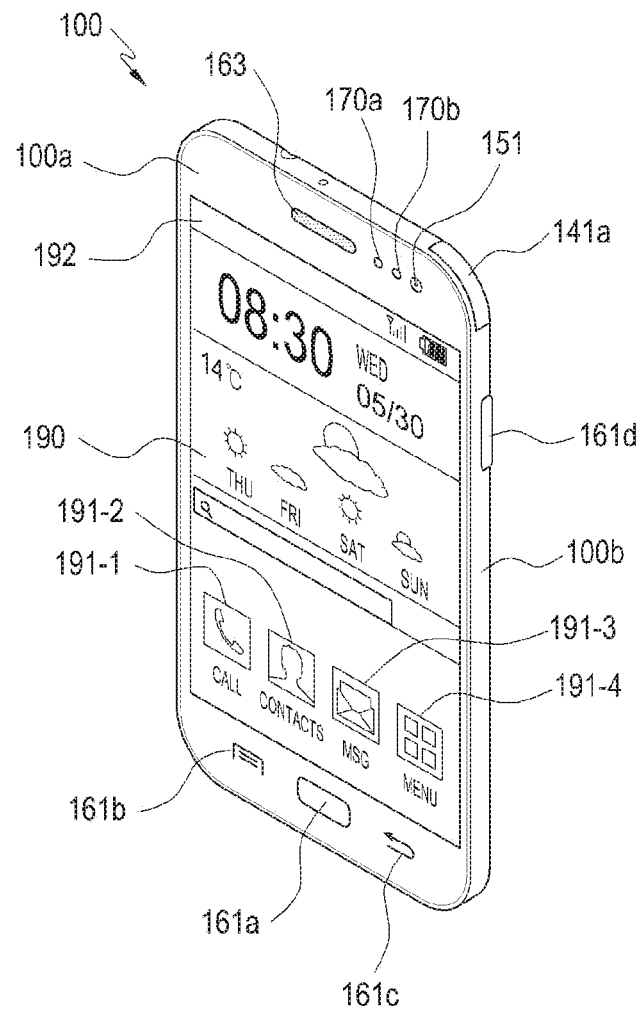
FIG. 2 illustrates a front perspective view of a mobile terminal according to an embodiment of the present invention.
Figure 3:
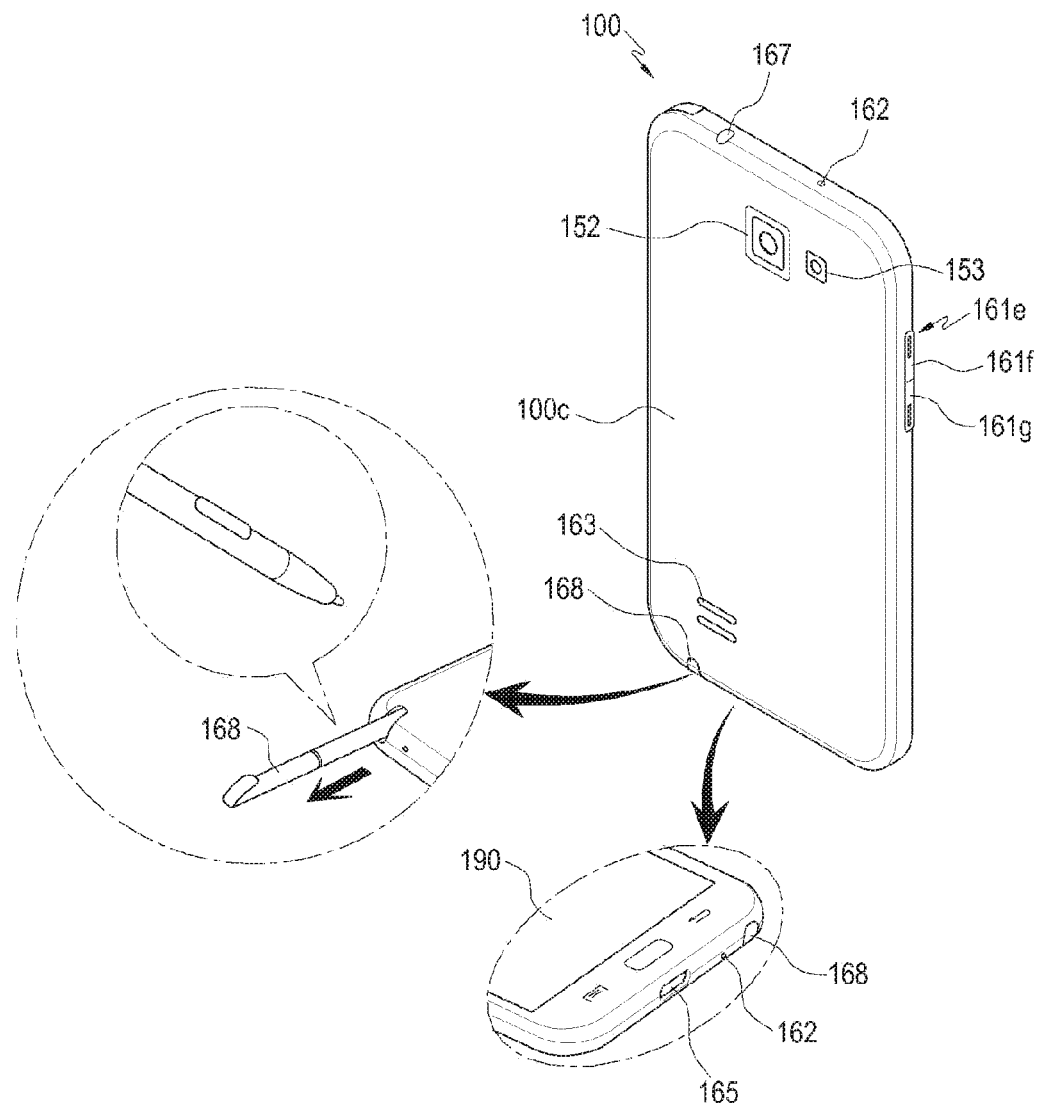
FIG. 3 illustrates a rear perspective view of a mobile terminal according to an embodiment of the present invention.

FIG. 2 illustrates a front perspective view of a mobile terminal according to an embodiment of the present invention, and FIG. 3 illustrates a rear perspective view of a mobile terminal according to an embodiment of the present invention.

Referring to FIGS. 2 and 3, the touch screen display 190 is disposed at the center of the front 100a of the mobile terminal 100. The touch screen 190 may be formed large enough to occupy most of the front 100a of the mobile terminal 100. In FIG. 2, a main home screen is displayed on the touch screen display 190. The main home screen is the first screen that is displayed on the touch screen display 190 upon power up of the mobile terminal 100. If the mobile terminal 100 has different home screens of multiple pages, the main home screen may be the first home screen among the home screen of multiple pages. Shortcut icons 191-1, 191-2 and 191-3 are displayed on the home screen for executing frequently used applications. Further, the home screen includes a main menu switch key 191-4, time, and weather. The main menu switch key 191-4 is provided to display a menu screen on the touch screen display 190. A status bar 192 is located at the top of the touch screen display 190, indicating the states of the mobile terminal 100, such as a battery level and a Received Signal Strength Indication (RSSI). A home button 161*a*, a menu button 161*b*, and a back button 161*c* formed under the touch screen display 190.

A first camera 151, an illuminance sensor 170*a*, a proximity sensor 170*b*, and the speaker 163 are mounted on the edge of the front 100*a* of the mobile terminal 100, and a second camera 152 and a flash 153 are mounted at the rear 100*c* of the mobile terminal 100.

On the side 100*b* of the mobile terminal 100, a power/rest button 161*d*, volume buttons 161*e* and 161*g*, a terrestrial DMB antenna 141*a* for receiving broadcast signals, and one or multiple microphones 162 are mounted.

A connector 165 is formed at the bottom of the mobile terminal 100 and an earphone connecting jack 167 is formed at the upper side of the mobile terminal 100.

The input tool 168 is stored in the lower side of the mobile terminal 100. The input tool 168 may be inserted and kept in the mobile terminal 100, and may be pulled out and detached from the mobile terminal 100 during its use.

Figure 4:
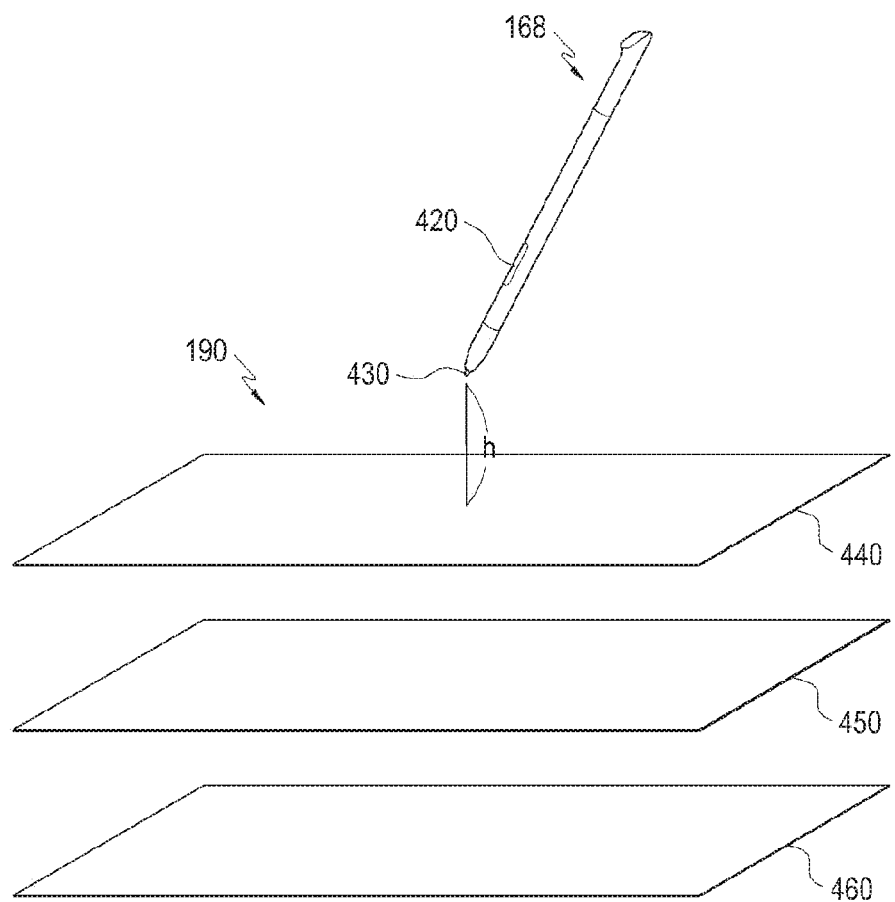
FIG. 4 illustrates an input tool and an internal cross-sectional view of a touch screen according to an embodiment of the present invention.

FIG. 4 illustrates an input tool and an internal cross-sectional view of a touch screen according to an embodiment of the present invention.

Referring to FIG. 4, the touch screen display 190 includes a first touch panel 440, a display panel 450, and a second touch panel 460. The display panel 450 may be a panel such as an LCD panel and an Active Mode OLED (AMOLED) panel, and displays various images and objects, which are associated with various operating states of the mobile terminal 100, running applications, and services.

The first touch panel 440, i.e., a capacitive touch panel, is a dielectric-coated panel, on both glass sides of which a thin metallic conductive material (for example, an Indium Tin Oxide (ITO) film) is coated so that a current may flow on and charges may be stored in the glass surfaces. If a user's fingertip or the input tool 168 touches the surface of the first touch panel 440, a predetermined amount of charge moves to the touched position by static electricity, and the first touch panel 440 detects the touched position by recognizing the change in current due to the movement of the charge. The first touch panel 440 may detect all kinds of touches which may generate the static electricity. For example, the first touch panel 440 may detect the touches made by both the fingertip and the input tool 168.

The second touch panel 460, i.e., an Electronic Magnetic Resonance (EMR) touch panel, includes an electromagnetic induction coil sensor (not shown) in which multiple loop coils are disposed in a predetermined first direction and a second direction crossing the first direction, having a grid structure, and an electronic signal processor (not shown) for sequentially providing Alternating Current (AC) signals having a specific frequency to the loop coils of the electromagnetic induction coil sensor. If the input tool 168 having a built-in resonant circuit exists around a loop coil of the second touch panel 460, a magnetic field transmitted from the loop coil generates a current that is based on the mutual electromagnetic induction, in the resonant circuit in the input tool 168. Based on the current, an induced magnetic field is generated from a coil (not shown) of the resonant circuit in the input tool 168, and the second touch panel 460 detects the hovering position and the touch position of the input tool 168 by detecting the induced electromagnetic field from the loop coil that is in a signal receive state.

The mobile terminal 100 detects a height 'h' from the display panel 450 to a nib 430 of the input tool 168. The height 'h' from the first touch panel 440 of the touch screen 190 to the nib 430 is subject to change depending on the performance or structure of the mobile terminal 100. Any input tool 168 may detect hovering and touch using the second touch panel 460 as long as it can generate an electromagnetic induction-based current. It will be assumed that the second touch panel 460 is used only to detect hovering or touch by the input tool 168. The input tool 168 may also be referred to as an electromagnetic pen or an EMR pen. The input tool 168 may be different from the common pen with no resonant circuit, which is detected using the first touch panel 440. The input tool 168 includes a button 420 capable of changing an electromagnetic induction value generated by a coil disposed in a penholder in an area adjacent to the nib 430.

The controller 110 may include a first touch panel controller and a second touch panel controller. The first touch panel controller converts analog signals, which are received from the first touch panel 440 by detecting the touch of the fingertip or the input tool 168, into digital signals (for example, X/Y/Z coordinates). The second touch panel controller converts analog signals, which are received from the second touch panel 460 by detecting the hovering or touch of the input tool 168, into digital signals. The controller 110 may control the display panel 450 and the first and second touch panels 440 and 460 using the digital signals received from the first and second touch panel controllers. For example, the controller 110 may display a screen on the display panel 450 in a predetermined form in response to the hovering or touch of the fingertip, the pen, or the input tool 168.

In the mobile terminal 100 proposed by an embodiment of the present invention, the first touch panel 440 detects a touch by the user's fingertip or the pen, while the second touch panel 460 detects a hovering or touch by the input tool 168. Therefore, the controller 110 of the mobile terminal 100 may separately detect the touch by the user's finger tip or the pen, and the hovering or touch by the input tool 168.

Although only one touch screen is illustrated in FIG. 4, the present invention is not limited to only one touch screen and may be applied to multiple touch screens. The touch screens may be mounted on their associated housings and connected by a hinge, or the multiple touch screens may be mounted on a single housing. Each of the multiple touch screens includes a display panel and at least one touch panel, as illustrated in FIG. 4.

Figure 5:
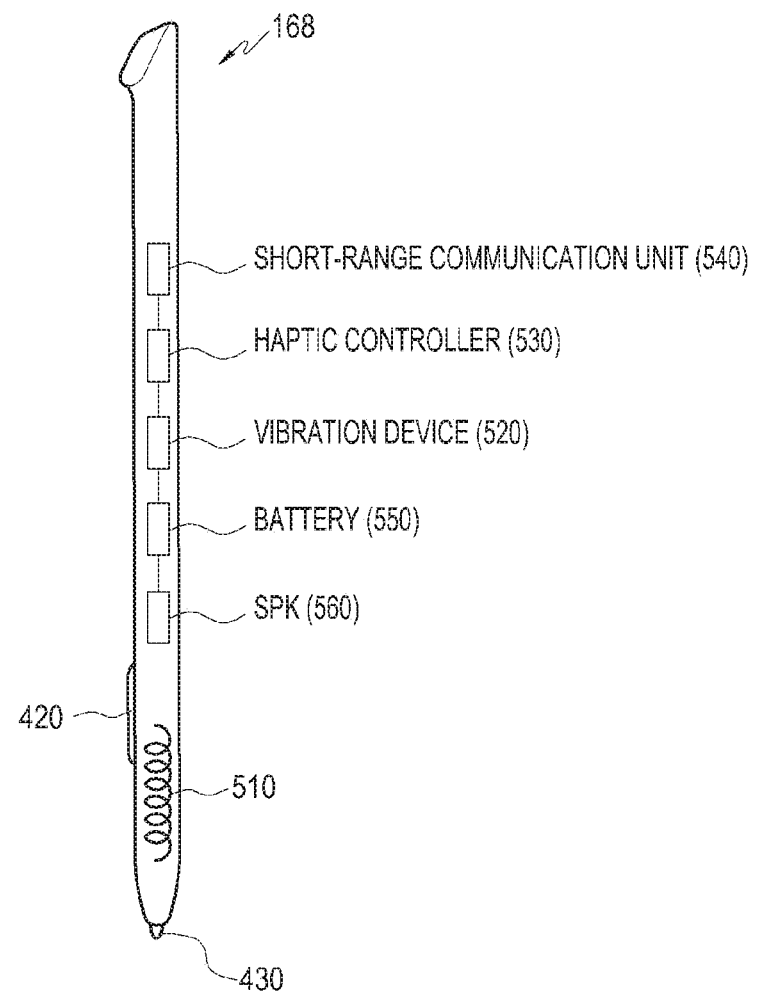
FIG. 5 is a block diagram of an input tool according to an embodiment of the present invention.

FIG. 5 is a block diagram of an input tool according to an embodiment of the present invention.

Referring to FIG. 5, the input tool 168 include a nib 430 disposed at the end of the input tool 168, the button 420 for changing an electromagnetic induction value generated by the coil 510 that is disposed in an area adjacent to the nib 430 within the input tool 168, the vibration device 520 that vibrates upon occurrence of hovering input effects, a haptic controller 530 for analyzing control signals that are received from the mobile terminal 100 when hovering over the mobile terminal 100, and controlling the vibration strength and vibration cycle of the vibration device 520 to provide the associated haptic effects to the input tool 168, and a battery 550 for supplying power for short-range communication between a short-range communication unit 540 and the mobile terminal 100 and for vibration of the input tool 168. In addition, the input tool 168 includes a speaker 560 for outputting a sound corresponding to the vibration cycle and/or vibration strength of the input tool 168. The speaker 560 may output the sound corresponding to the haptic effects provided to the input tool 168 at the same time as the speaker 163 mounted in the mobile terminal 100, or a predetermined time (for example, 10 ms) before/after the speaker 163 outputs a sound.

More specifically, the speaker 560, under control of the haptic controller 530, may output sounds corresponding to various signals (e.g., wireless signals, broadcast signals, digital audio files and/or digital video files), which are provided in the mobile terminal 100. In addition, the speaker 560 may output sounds (for example, button manipulation tones corresponding to phone calls, ring-back tones, etc.) corresponding to the functions performed by the mobile terminal 100. One or multiple speakers 560 may be formed in a proper position(s) of the housing of the input tool 168.

The haptic controller 530 activates or enables the short-range communication unit 540 and the vibration device 520, if the input tool 168 is located adjacent to the touch screen 190 of the mobile terminal 100 or receives at least control signal from the mobile terminal 100. In contrast, the haptic controller 530 inactivates or disables the vibration device 520, if the input tool 168 is not located adjacent to the touch screen 190 of the mobile terminal 100 or completes the vibrations by receiving at least one control signal from the mobile terminal 100.

The touch screen 190 detects the position of the input tool 168. Specifically, if the input tool 168 is located adjacent to the surface of the touch screen 190, a predetermined amount of charge moves to the adjacent location by the static electricity, and the touch screen 190 detects the adjacent location by recognizing the change in current due to the movement of charges. Accordingly, the touch screen 190 may recognize as if the input tool 168 is within a predetermined distance of the touch screen 190, even though it has not actually touched the touch screen 190.

If the nib 430 is placed on or over the touch screen 190, the haptic controller 530 analyzes at least one control signal that is received from the mobile terminal 100 via the short-range communication unit 540, and controls the vibration cycle and the vibration strength of the vibration device 520 provided in the input tool 168 depending on the analyzed control signal. The control signal is a signal transmitted by the mobile terminal 100, and may be periodically transmitted to the input tool 168 for a predetermined time or until the hovering is terminated.

Specifically, if a hovering or a touch occurs as the nib 430 approaches the touch screen 190, the mobile terminal 100 determines an object (or icon) on the touch screen 190, which is indicated by the nib 430, and transmits the control signal generated depending on a haptic pattern that is set in advance for the object, to the short-range communication unit 540 configured in the input tool 168. For example, the control signal may have different vibrations depending on the type of the object being selected or hovered over on the touch screen display 190 (for example, an image, a video, an SMS message, an MMS message and an E-mail), or may have different vibrations depending on properties of the object, e.g., the number of objects, content of the object, genre of the object, importance of the object, etc.

More specifically, the control signal is transmitted to the input tool 168 by the transceiver 120 in the mobile terminal 100. The control signal may include at least one of information for activating a mode of the vibration device 520 in the input tool 168, information indicating vibration strength of the input tool 168, information for inactivating the mode of the vibration device 520 in the input tool 168, and information indicating the total time for which the haptic effects are provided. The control signal has a length of about 8 bits and is repeatedly transmitted at a predetermined cycle (for example, 5 ms) to control vibrations of the input tool 168. Accordingly, the user may recognize that vibrations associated with the haptic effects are repeatedly performed at a predetermined cycle. For example, the control signal may include information as shown in Table 1 below.

TABLE 1

| Field | Activation of vibration device | Vibration strength | Inactivation of vibration device |
|---|---|---|---|
| Info | 1 | 125 125 131 131 0 | 2 |

As shown in Table 1, the control signal includes information for activating the vibration device 520 in the input tool 168, information indicating the vibration strength of the vibration device 520, and information for inactivating the vibration device 520. Although the control signal may be transmitted to the input tool 168 every 5 ms, this is merely an illustrative example and the transmission of the control signal is subject to change depending on the cycle of the haptic pattern. The transmission cycle and transmission period of the control signal are also subject to change. The transmission period may last until the hovering recognition is terminated.

The type of the object and the properties of the object may be determined based on the unique characteristics of each object (for example, E-mail addresses of a sender and a recipient in the case of an E-mail, and a resolution and a shooting time of a taken photo in the case of a photo). It will be apparent to those of ordinary skill in the art that the present invention may be applied to any other methods for determining the type and/or properties of an object.

When the control signal is associated with a video, the control signal may vary depending on the genre of the video or the high-importance part of the video, and the control signal may vary depending on the number of objects. The genre or the high-importance part of the video may be set in advance by the user, and the controller 110 may determine the genre of the video or the high-importance part of the video depending on the set information.

For a folder with many objects, the control signal may be a signal for increasing the vibration strength, and for a folder with few objects, the control signal may be a signal for decreasing the vibration strength. The number of objects stored in one folder may be set by the user, or may be set by default by the manufacturer.

For frequently contacted contacts, the control signal may be a signal for increasing the vibration strength, and for less frequently contacted contacts, the control signal may be a signal for decreasing the vibration strength.

In addition, the mobile terminal 100 provides a scroll bar for supporting the shift to a position of the object that the user desires to select on the touch screen 190, or provides a function for listing-up/down instead of the scroll bar. The listing-up/down indicates that a plurality of objects being displayed in the touch screen are displayed by user swipe action or user flick action. For example, if multiple objects cannot be displayed all on one screen, the objects which are not displayed in the touch screen, may be displayed by the listing-up/down action. Such listing-up/down action represents a fast movement (i.e., flicks up and down or swipes up and down) on the touch screen. If the scroll bar is pull up or down using the input tool 168, the mobile terminal 100 transmits a control signal to the input tool 168 for increasing or decreasing the vibration strength as the scroll bar is closer to its first position (for example, the top or bottom of the touch screen 190), and transmits a control signal to the input tool 168 for decreasing or increasing the vibration strength as the scroll bar is close to its end (for example, the top or bottom of the touch screen 190).

When listing-up/down, the mobile terminal 100 transmits a control signal to the input tool 168 for increasing or decreasing the vibration strength depending on the number of objects, which changes due to the listing-up or down, e.g., if hovering by the input tool 168 corresponds to listing-up or down of multiple objects displayed on the touch screen 190. The scroll bar and the listing-up/down are functions for displaying the objects, which cannot be displayed on one screen due to the limited size of the touch screen 190, using the scroll bar or the listing-up/down while multiple objects are displayed on the touch screen 190. Commonly, the scroll bar is located at the right side and/or the bottom of the touch screen 190, and the listing-up/down is located at the top center and/or the bottom center of the touch screen 190. However, this is merely an illustrative example, and the scroll bar and the listing-up/down proposed by the present invention may be applied to different positions on the touch screen 190.

The input tool 168 supports an electromagnetic induction input method. If a magnetic field is formed at a specific point on the touch screen 190 by the coil 510, the touch screen 190 can recognize the touch point by detecting the position of the magnetic field.

FIGS. 6A to 6D illustrate an example of setting a haptic pattern depending on a type of an object according to an embodiment of the present invention.

Figures 6A, 6B:
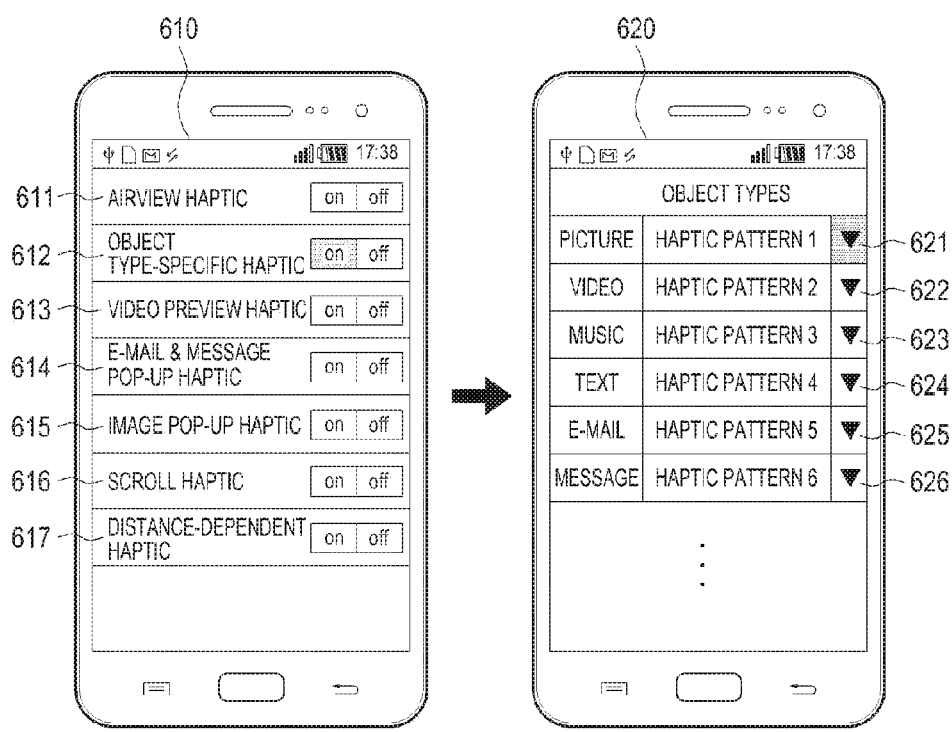
FIG. 6A illustrates item-specific settings of a mobile terminal using an input tool according to an embodiment of the present invention.
FIG. 6B illustrates an example of setting a haptic pattern according to an embodiment of the present invention.

Referring to FIG. 6A, multiple items are presented that represent haptic settings that are turned on or off More specifically, an airview haptic 611 is an item, for setting a haptic function when displaying internal information of an object over which the nib 430 of the input tool 168 is located in an airview mode. An object type-specific haptic 612 is an item for setting a haptic pattern according to a type of an object. A video preview haptic 613 is an item for setting a function of providing an airview-type preview function for non-played segments during playback of video, or showing a selected segment in a preview way for non-played video. Likewise, an E-mail & message pop-up haptic 614, an image pop-up haptic 615, a scroll haptic 616, and a distance-dependent haptic 617 are provided. In addition to the above-described functions, a variety of other settings may be used for providing a control signal to the input tool 168, upon detecting a hovering input.

FIG. 6B illustrates an example of setting a haptic pattern according to the type of an object if the item selected in FIG. 6A is the object type-specific haptic 612.

Referring to FIG. 6B, if the type of an object is picture, video, music, text, E-mail or text message, one of the different haptic patterns may be set by selecting one of setting buttons 621 to 626 according to the type of an object. These haptic patterns may be the same as or different from each other, and the haptic patterns may be designated or selected by the user, or may be selected at random. Vibration strength and vibration cycle of the haptic patterns may also be set.

Figures 6C, 6D:
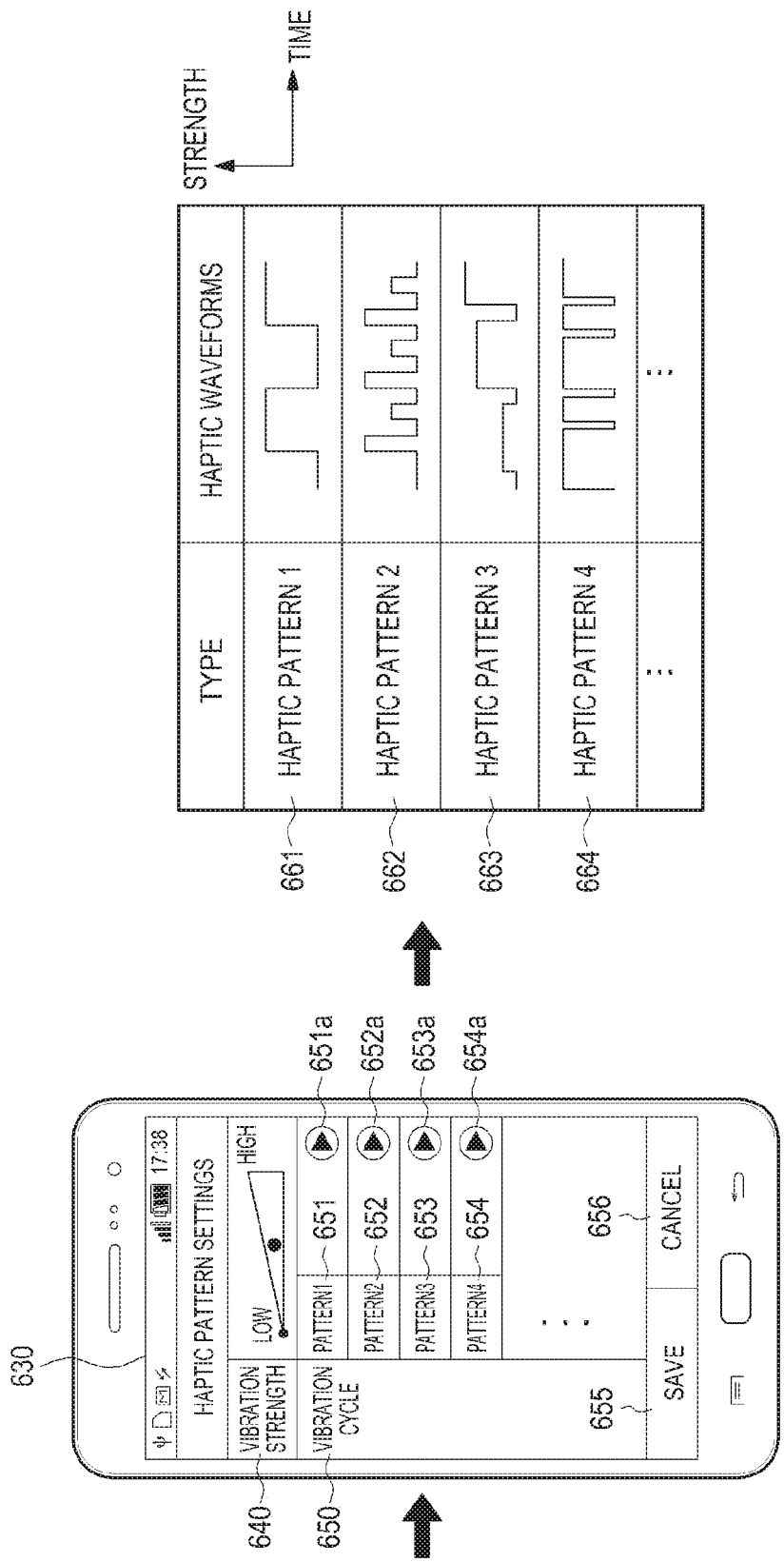
FIG. 6C illustrates a haptic pattern to be set according to an embodiment of the present invention.
FIG. 6D illustrates haptic waveforms associated with haptic patterns according to an embodiment of the present invention.

FIG. 6C illustrates a haptic pattern to be set if the type of an object is a picture in FIG. 6B.

More specifically, FIG. 6C illustrates a haptic pattern setting screen 630 when the type of an object is a picture. The haptic pattern setting screen 630 includes a vibration strength adjustment menu 640 for adjusting vibration strength of the input tool 168 upon occurrence of hovering as the input tool 168 is located over the picture, a vibration cycle menu 650 providing multiple vibration cycles, a save menu 655 for storing set vibration patterns, and a cancel menu 656 for canceling vibration patterns. The vibration cycle menu 650 has multiple haptic patterns 651 to 654, which may have same or different haptic waveforms.

FIG. 6D illustrates haptic waveforms associated with haptic patterns.

Referring to FIG. 6D, a waveform of each haptic pattern may be a periodic waveform or an aperiodic waveform. Vibration strength of the haptic patterns 661 to 664 may be designated by the user, and the haptic patterns 661 to 664 may have different vibration strengths.

In FIG. 6D, the horizontal axis (for example, x-axis) represents the time period, while the vertical axis (for example, y-axis) represents the vibration strength of the haptic patterns.

Although only four haptic patterns are illustrated in FIG. 6D, this is merely an illustrative example and the present invention is not limited to four haptic waveforms and may be applied to four or more haptic waveforms.

As illustrated, the haptic waveforms may be the same as or different from each other. For example, in terms of the haptic patterns that the user may recognize, a variety of haptic patterns may be provided, including a haptic pattern of allowing the user to feel the same or similar feeling to sawing vibrations when performing a sawing gesture or touching a sawing-related object; a haptic pattern of allowing the user to feel a calming feeling with a long vibration cycle and a low vibration strength; a haptic pattern of allowing the user to feel a strong feeling with a short vibration cycle and a high vibration strength; and a haptic pattern of allowing the user to feel the same or similar feeling to the vibrations that he or she may feel when scratching the rough surfaces such as walls. The haptic patterns are not limited to the above-described illustrative haptic patterns, but may be applied to all kinds of other vibrations that the user may feel. Other haptic patterns according to an embodiment of the present invention will be described in more detail with reference to FIGS. 17A to 17I.

If an object, for which a haptic pattern is set, is selected by the input tool 168, a control signal associated with the haptic pattern that is set for the object is transmitted to the input tool 168, and the input tool 168 provides haptic effects to the user according to the received control signal.

It will be apparent to those of ordinary skill in the art that the menus illustrated in FIG. 6C for setting these haptic patterns and the set waveforms illustrated in FIG. 6D are merely illustrative examples, and the present invention is not limited thereto and may include a variety of other ways to select and set haptic patterns.

Figures 7A, 7B:
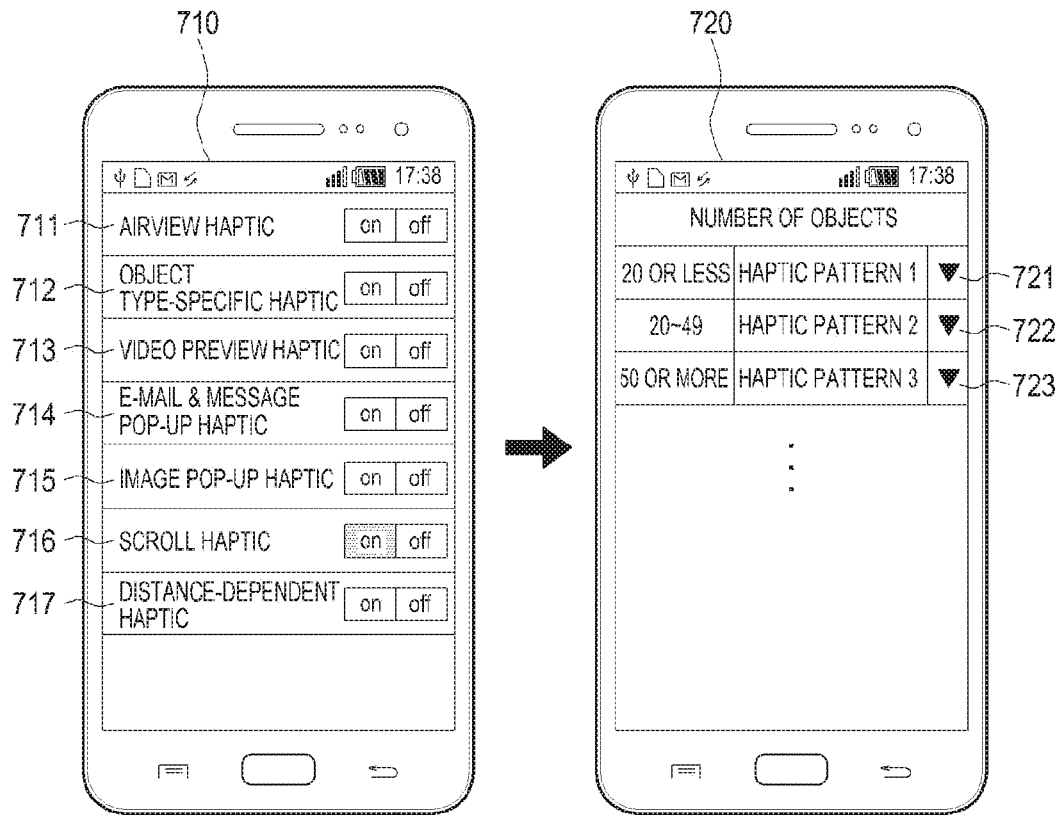
FIG. 7A illustrates item-specific settings for haptic feedback according to an embodiment of the present invention.
FIG. 7B illustrates an example of setting a haptic pattern according to an embodiment of the present invention.

FIGS. 7A and 7B illustrate an example of setting a haptic pattern according to the number of objects according to an embodiment of the present invention.

Referring to FIG. 7A, similar to FIG. 6A, items for setting haptic patterns according to an embodiment of the present invention include an airview haptic 711, an object type-specific haptic 712, a video preview haptic 713, an E-mail & message pop-up haptic 714, an image pop-up haptic 715, a scroll haptic 716, and a distance-dependent haptic 717.

By selecting the scroll haptic 716 from these multiple items, the user may set a different haptic pattern depending on the number of objects to be displayed on the screen, during adjustment of scroll, as illustrated in FIG. 7B. For example, if the number of objects to be displayed on the screen is 20 or less, the user may set a haptic pattern by selecting a button 721. In other words, the user may set vibration strength and/or vibration cycle. Similarly, if the number of objects is between 20 and 49, the user may set a haptic pattern by selecting a button 722, and if the number of objects is 50 or more, the user may set a haptic pattern by selecting a button 723. These haptic patterns include vibration strength and vibration cycle.

Figure 8A:
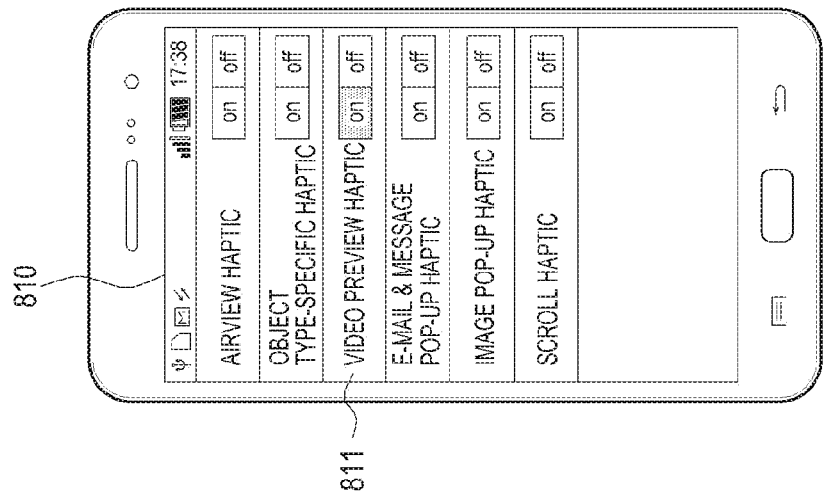
FIG. 8A illustrates item-specific settings for haptic feedback according to an embodiment of the present invention.
Figure 8B:
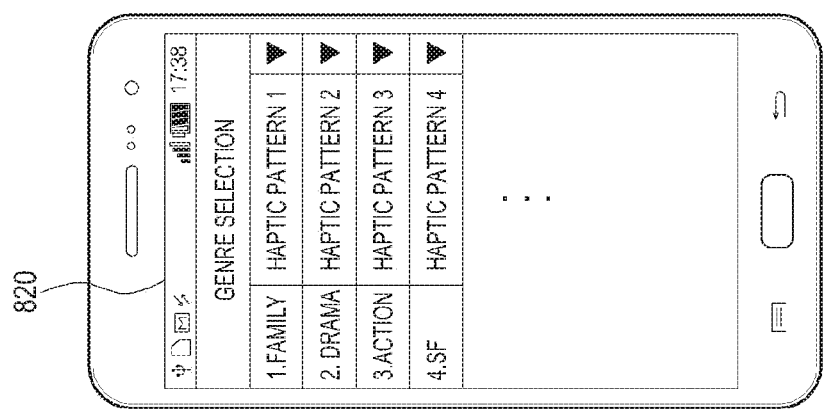
FIG. 8B illustrates an example of setting a haptic pattern according to an embodiment of the present invention.
Figure 8C:
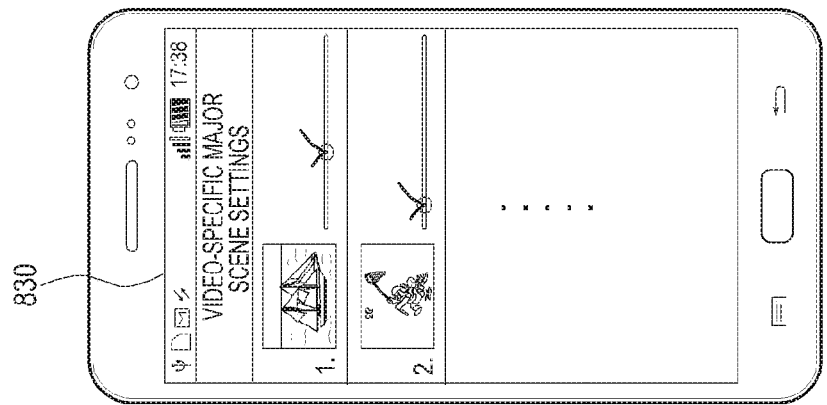
FIG. 8C illustrates an example of setting a major scene in video for which a haptic pattern is set according to an embodiment of the present invention.

FIGS. 8A to 8C illustrate an example of setting a haptic pattern for a video object and setting a major scene according to an embodiment of the present invention.

Referring to FIGS. 8A to 8C, a haptic pattern that is different depending on the genre of video is set, as illustrated by reference numeral 820, by activating a video preview haptic 811 on screen 810. For example, each haptic pattern (for example, vibration strength and/or vibration cycle) may be set differently depending on whether the genre of video is family, drama, action or Science Fiction (SF), and the set vibration strength and/or vibration cycle may be applied to a specific video segment that is determined to be important in the video, as shown by reference numeral 830. Thereafter, if the input tool 168 approaches an object of the video, the mobile terminal 100 transmits a control signal associated with the set haptic pattern to the input tool 168, and the input tool 168 controls its vibration based on the received control signal.

Figures 9A, 9B:
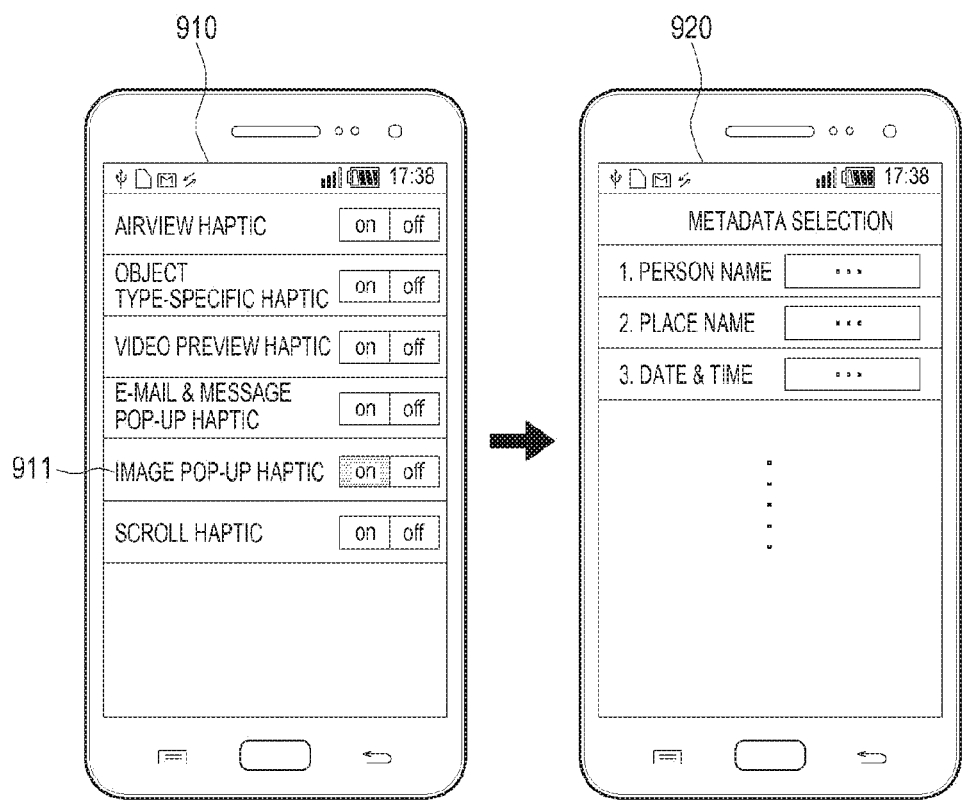
FIG. 9A illustrates an example of activating an image pop-up haptic function according to an embodiment of the present invention.
FIG. 9B illustrates an example of entering image information in metadata according to an embodiment of the present invention.

FIGS. 9A and 9B illustrate an example of activating an image pop-up haptic function and entering image information in metadata according to an embodiment of the present invention.

Referring to FIGS. 9A and 9B, an image pop-up haptic 911 is activated (or turned 'on') on screen 910 for an object that is displayed or stored on/in the mobile terminal 100, in order to provide haptic effects to the input tool 168. Thereafter, a metadata selection menu 920 is activated, in which the user may enter information about an image. The metadata has items in which different types of information about the image may be written. Information about items that can be written in the metadata may include information that is entered by the user, or information that is automatically entered by the mobile terminal 100. Herein, information about these items may be entered by both the user and the mobile terminal 100, and in this case, that may be determined according to the priority of an object whose information is entered in the items. For example, if the image is a photo, a name of the person taken in the photo, a name of the place where the photo was taken, and the date and time when the photo was taken may be written in the metadata. The person's name and the place's name may be entered by the user, and the date/time and the place may be automatically entered by the mobile terminal 100 by analyzing and determining a header of the taken object.

The metadata generated by entering the information about an image is stored. If hovering is recognized as the input tool 168 approaches the image, a haptic pattern is set. The haptic pattern is a control signal for vibrating the input tool 168, and may be set as at least one of the vibration cycle and the vibration strength. Thereafter, if hovering by the input tool 168 is recognized, the airview function is activated, the image is zoomed in and displayed on the touch screen 190, and the metadata information is displayed on the preview image. In addition, the mobile terminal 100 transmits a control signal associated with the haptic pattern that is set for the image, to the input tool 168, and the input tool 168 analyzes the received control signal and provides haptic effects using at least one of the vibration cycle and the vibration strength.

Figure 10:
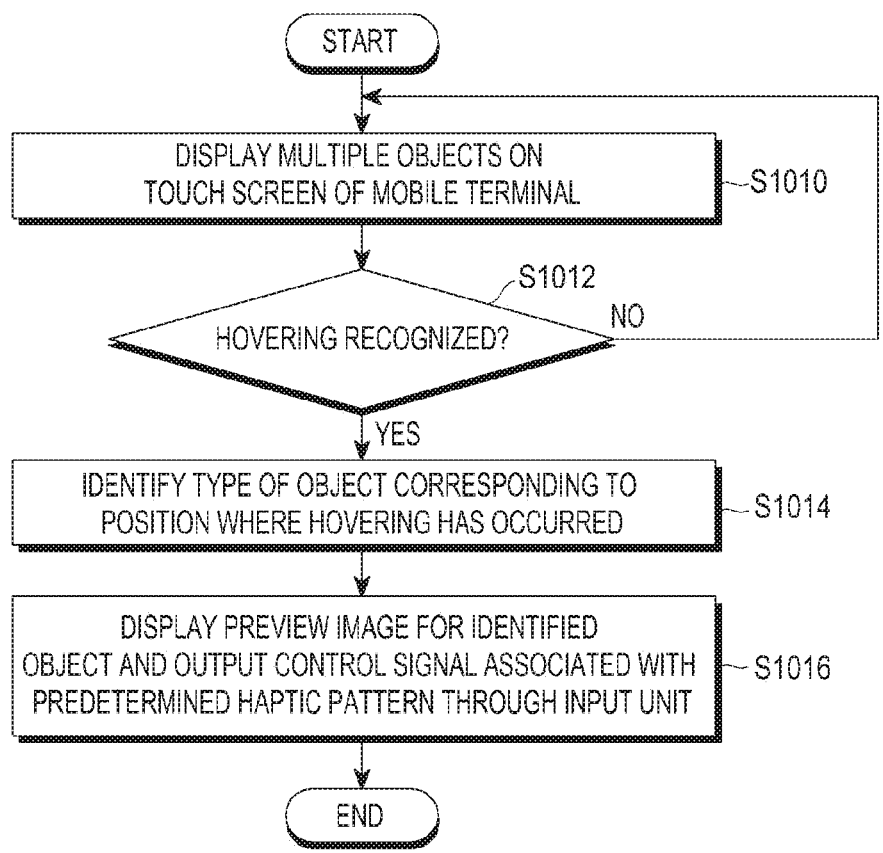
FIG. 10 is a flowchart illustrating a process of displaying preview images of objects and transmitting control signals associated with haptic patterns according to an embodiment of the present invention.

FIG. 10 is a flowchart illustrating a process of displaying preview images of objects and transmitting control signals associated with haptic patterns if hovering is recognized over multiple objects according to an embodiment of the present invention.

Referring to FIG. 10, while multiple objects are displayed on the touch screen 190 of the mobile terminal 100, hovering by the input tool 168 is detected to select one of the multiple objects on the touch screen 190. Specifically, in steps S1010 and S1012, the mobile terminal 100 determines whether hovering is recognized as the input tool 168 approaches an object. Herein, the term "hovering" refers to the mobile terminal 100 recognizing that the input tool 168 is placed within a predetermined distance of the touch screen 190 (for example, 3 mm). The predetermined distance may be changed by the mobile terminal manufacturer or the user.

Upon recognizing the hovering of the input tool 168, the mobile terminal 100 identifies a type of an object corresponding to the position where the hovering has occurred, in step S1014. The touch screen 190 of the mobile terminal 100 may display multiple objects including various files (such as videos, images, E-mails, SMS messages, MMS messages, Word® documents and music), shortcut icons, and folders for grouping multiple files.

After identifying the type of an object, the mobile terminal 100 analyzes contents of the object. Specifically, if the type of an object is an image, the terminal 100 determines whether there is metadata in the image. If the type of an object is video, the mobile terminal 100 determines whether there is a segment predetermined by the user in the video. If the type of an object is a document, the mobile terminal 100 determines whether there is a predetermined character string in the document.

Herein, the objects are not limited to the above-described types of objects, and may include all kinds of shortcut icons and files that can be stored or displayed in/on the mobile terminal 100.

In step S1016, the mobile terminal 100 displays a preview image for the identified object, and transmits a control signal associated with a predetermined haptic pattern corresponding to the identified object, to the input tool 168. The preview image shows content designated or set for the object to overlap the object or its surrounding in the form of a pop-up window, if hovering occurs over the object, and may be content that is set in advance by the user depending on the type or properties of the object, or may be content (or details) of the object. In addition, the preview image may be an image obtained by zooming in or out the object over which hovering has occurred. The preview image includes at least one of the details of the object, the metadata that is entered in advance in the object, and an image obtained by zooming in the object, depending on the type of the object.

The preview image is displayed on the touch screen 190, and a control signal associated with the haptic pattern is transmitted to the input tool 168 by the mobile terminal 100. The control signal associated with the haptic pattern controls at least one of the vibration strength and vibration cycle of the input tool 168 as the haptic pattern. The mobile terminal 100 may transmit a control signal associated with the haptic pattern, after displaying the preview image, or may transmit the control signal associated with the haptic pattern before displaying the preview image. Alternatively, the mobile terminal 100 may transmit the control signal associated with the haptic pattern while displaying the preview image.

This haptic pattern may be set in advance depending on the type and properties of an object, and may be set differently depending on the distance between the input tool 168 and the touch screen 190. Specifically, the mobile terminal 100 sets the haptic pattern depending on at least one of the type of an object, the number of objects, the contents of an object, the importance of an object, and the genre of an object, and the set haptic pattern is stored. As for the importance, if a character string that the user considers important is set in advance for an object, the mobile terminal 100 determines the importance of an object by analyzing the character string.

If the hovering position corresponds to a scroll bar on the touch screen 190, the haptic pattern may be set differently depending on the number of objects, which changes as the input tool 168 moves up/down or left/right over the scroll bar, and the setting results are stored.

Figures 11A, 11B, 11C:
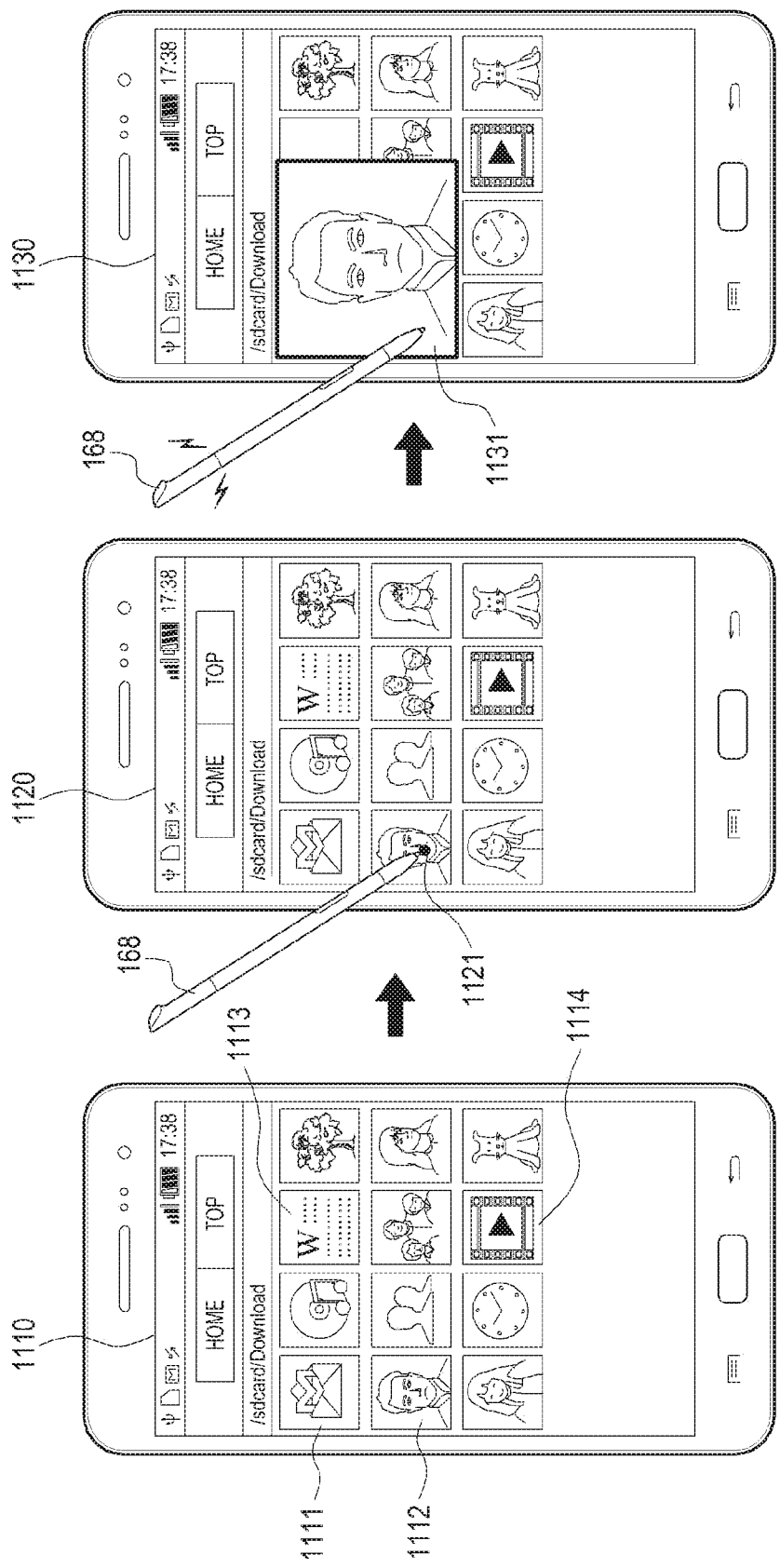
FIGS. 11A to 11C illustrate a method of displaying a preview image of an object over which hovering is recognized according to an embodiment of the present invention.

FIGS. 11A to 11C illustrate an example of displaying a preview image of an object upon recognizing hovering over an object according to an embodiment of the present invention.

Referring to FIGS. 11A to 11C, a variety of objects are displayed on screen 1110 including an E-mail 1111, a photo 1112, a Word® file 1113 and video 1114. If a photo 1121 is selected by hovering the input tool 168 over the photo 1121, the mobile terminal 100 determines that the object is a photo, by identifying the object (i.e., the photo 1121) corresponding to the position where the hovering has occurred. Subsequently, the mobile terminal 100 displays a preview image by zooming in the selected photo, and transmits at least one control signal associated with a haptic pattern that was set in advance for the photo, to the input tool 168. Thereafter, the input tool 168 vibrates in the haptic pattern corresponding to the received control signal, allowing the user to feel the vibrations of the predetermined haptic pattern.

FIGS. 12A and 12B illustrate an example in which hovering indicates listing-down of multiple objects, according to an embodiment of the present invention.

Referring to FIGS. 12A and 12B, if multiple objects cannot be displayed all on one screen, the objects, which are not displayed, may be displayed by a listing-up/down function. In order to display the objects which are not displayed, if the input tool 168 is put over an icon 1222 for listing-up/down, the mobile terminal 100 detects hovering over the icon 1222 and determines that a list-down command has been entered. In response, the mobile terminal 100 upwardly displays the list of objects which are not currently displayed on the touch screen 190, thereby displaying the objects which are not displayed. While the listing-up/down of objects is being performed, at least one control signal associated with the set haptic pattern is transmitted to the input tool 168. The input tool 168 analyzes the received control signal, and vibrates by controlling at least one of the vibration strength and the vibration cycle depending on the set haptic pattern.

As illustrated in FIG. 7B, the haptic pattern may be set differently depending on the number of objects which are not displayed. For example, as illustrated in FIG. 7B, the haptic pattern may be set differently depending on whether the number of objects is 20 or less, between 20 and 49, and 50 or more. The number of objects which are not displayed may be determined by subtracting the number of objects presently being displayed from the total number of objects. For example, if a total of 60 phone numbers are stored in a phonebook and the first six phone numbers (starting from an alphabet of A) are currently displayed, the number of phone numbers, which are not displayed, is 54. If the phonebook screen currently being displayed shows a phone number corresponding to the middle (for example, of the letter C), the user may determine the number of phone numbers (starting with the letters D to Z) which are not displayed, following the phone numbers which correspond to the middle and are displayed.

Figure 13:
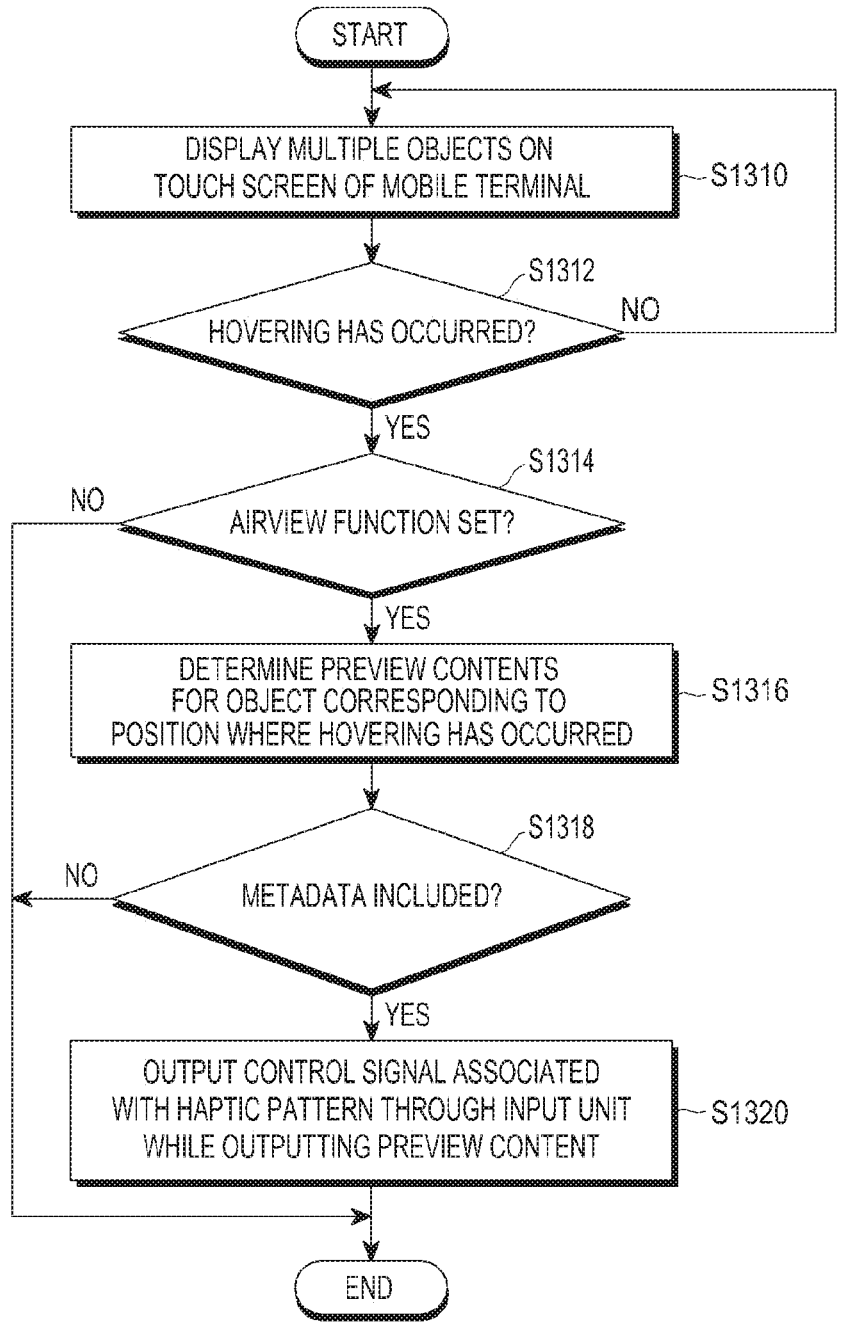
FIG. 13 is a flowchart illustrating a process of displaying metadata of an object as a preview image and transmitting a control signal associated with a haptic pattern to an input tool according to an embodiment of the present invention.
Figure 14:
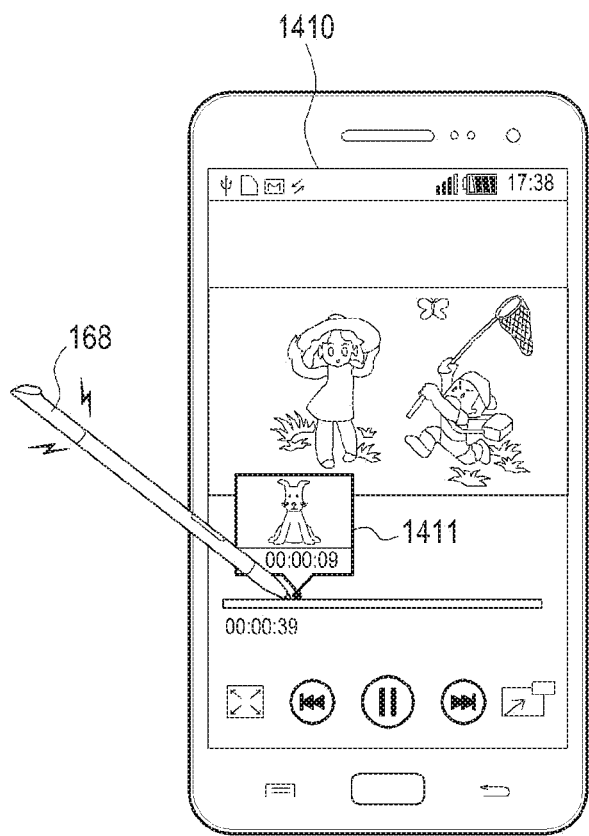
FIG. 14 illustrates an example of displaying metadata of an object as a preview image according to an embodiment of the present invention.

FIG. 13 is a flowchart illustrating a process of displaying metadata of an object as a preview image and transmitting a control signal associated with a haptic pattern to an input tool according to an embodiment of the present invention, and FIG. 14 illustrates an example of displaying metadata of an object as a preview image according to an embodiment of the present invention.

Referring to FIG. 13, in steps S1310 and S1312, while multiple objects are displayed on the touch screen 190 of the mobile terminal 100, the mobile terminal 100 determines whether hovering of the input tool 168 is recognized over the touch screen 190. If hovering is recognized in step S1312, the mobile terminal 100 checks whether the airview function is set in step S1314. For example, if the airview function is the default setting for displaying a preview image, and is a function of overlapping a preview image over the object that is displayed on the touch screen 190, to display a preview image, the airview function should be activated.

If the airview function is set, the mobile terminal 100 determines preview content 1411 corresponding to the object at the position where hovering has occurred, in step S1316. For example, the mobile terminal 100 determines whether the object at the position where hovering has occurred, is an image or video, and then determines a preview image to be displayed. Specifically, if the object is determined as an image, the mobile terminal 100 displays metadata, in which content of the image is stored, as a preview image, and if the object is determined as video, the mobile terminal 100 plays the video after jumping to the position where the hovering has occurred. In order to play the video after jumping to the position where the hovering has occurred, the mobile terminal 100 may display the metadata, which is stored in advance for the video, as a preview image.

In step S1318, the mobile terminal 100 determines whether metadata, in which a haptic pattern is set, is included in the preview content. As described above, the metadata includes detailed information about an image or video, and if the object is an image like a photo, the metadata may include a name of a person in the photo, a name of the place where the photo was taken, and the date and time when the photo was taken.

If metadata, in which a haptic pattern is set, is included in the preview content in step S1318, the mobile terminal 100 transmits a control signal associated with a determined haptic pattern corresponding to the metadata data, to the input tool 168, while outputting the determined preview content as a preview image using the airview function, in step S1320. The haptic pattern corresponding to the metadata may be set in advance by the user.

Figure 15:
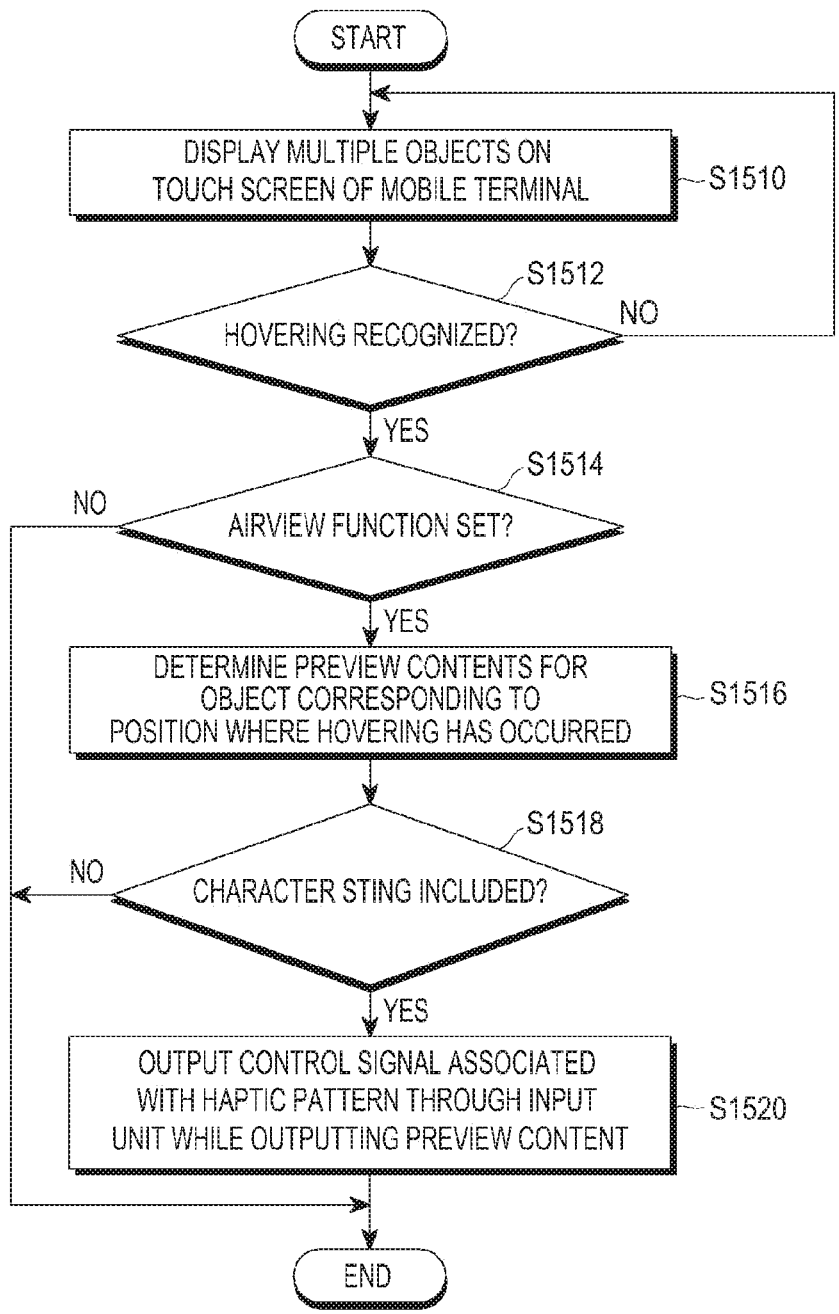
FIG. 15 is a flowchart illustrating a process of displaying content associated with an object as a preview image and transmitting a control signal associated with a haptic pattern to an input tool according to an embodiment of the present invention.

FIG. 15 is a flowchart illustrating a process of displaying content of an object as a preview image and transmitting a control signal associated with a haptic pattern to an input tool according to an embodiment of the present invention.

Referring to FIG. 15, in steps S1510 and S1512, while multiple objects are displayed on the touch screen 190 of the mobile terminal 100, the mobile terminal 100 determines whether hovering of the input tool 168 is recognized over the touch screen 190.

If hovering is recognized in step S1512, the mobile terminal 100 checks whether the airview function is set in step S1514.

If the airview function is set, the mobile terminal 100 determines preview content about the object corresponding to the position where hovering has occurred, in step S1516. Specifically, the mobile terminal 100 determines whether an object corresponding to the position where hovering has occurred, is an E-mail, a text message, or a phone number list, determines a format of the content to be displayed in a preview image according to the type of the determined object, and displays the content of the object in the determined format. For example, if the object is an E-mail, the mobile terminal 100 displays the details of the E-mail in the preview message, and if the object is an incoming and outgoing text message, the mobile terminal 100 displays the details of the text message corresponding to the position where hovering has occurred using a preview message.

In step S1518, the mobile terminal 100 checks whether there is a predetermined character string in the content to be displayed in the preview image. The character string is determined in advance depending on the user's preference, and the characteristics of the related object may be determined based on the character string. For example, if the object includes economic terms (for example, inflation, employment rates, stocks, quotes, and exchange rates), the object is classified as economy-related news or E-mail. In step S1520, the mobile terminal 100 transmits, to the input tool 168, a control signal associated with a predetermined haptic pattern corresponding to the predetermined character string while displaying content of the object in a determined preview message.

FIGS. 16A to 16C illustrate an example of displaying contents of an object as a preview image according to an embodiment of the present invention.

Referring to FIGS. 16A to 16C, in FIG. 16A, if the user places the input tool 168 over the object desired to be read, the mobile terminal 100 displays the details of the object, over which hovering is recognized by the input tool 168, using a preview image 1611. The mobile terminal 100 transmits a control signal associated with a predetermined haptic pattern to the input tool 168, and the input tool 168 receives the control signal and controls at least one of its vibration strength and vibration cycle in a predetermined haptic pattern. Similarly, in order to determine the type (for example, economics, politics, society and culture) of an object depending on the character string, at least one word associated with the type and a haptic pattern associated with the character string may be designated in advance, and if the predetermined character string is included in the details of the object, the input tool 168 is controlled in a haptic pattern that is designated depending on the type.

Even for incoming and outgoing text messages, as illustrated in FIG. 16B, if the input tool 168 is placed on or over an arbitrary text message among the incoming and outgoing text messages, the mobile terminal 100 displays the details of the text message as a preview image. If a set character string, an emotional state associated with the set character string, and a haptic pattern associated with the character string are designated in the text message, the mobile terminal 100 checks if the received text message has the set character string, and determines moods, feelings, emotions and conditions of the person who sent the text message, based on the emotional state corresponding to the checked character string. The mobile terminal 100 transmits a control signal associated with the related haptic pattern to the input tool 168.

For example, in FIG. 16B, as for the incoming and outgoing text messages, the left side represents the text messages written by the other party, while the right side represents the text messages sent by the user. If the other party has sent a text message 'Good~OK! Let's Go to Boracay~~', the mobile terminal 100 may determine from the character strings 'Good' and 'OK' that the other party has a good feeling and accepts some suggestions. Based on these determinations, the mobile terminal 100 transmits a control signal associated with a predetermined haptic pattern to the input tool 168 depending on the other party's mood, and the input tool 160 vibrates by controlling at least one of the vibration strength and vibration cycle depending on the received control signal.

Similarly, even for a phone number list, if the input tool 168 is placed on or over an arbitrary phone number among multiple phone numbers, the mobile terminal 100 generates a preview image 1631 and displays the details of it in a preview image 1631.

FIGS. 17A to 17I illustrate waveforms of various haptic patterns according to embodiments of the present invention.

Figure 17A:
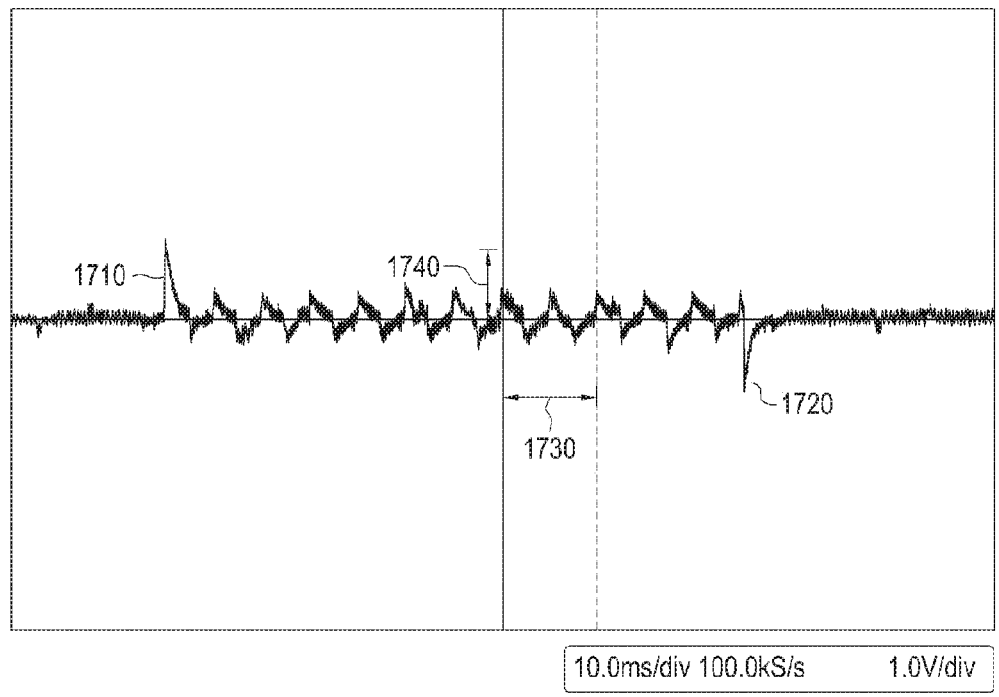
FIGS. 17A to 17I illustrate waveforms of various haptic patterns according to embodiments of the present invention.
Figure 17B:
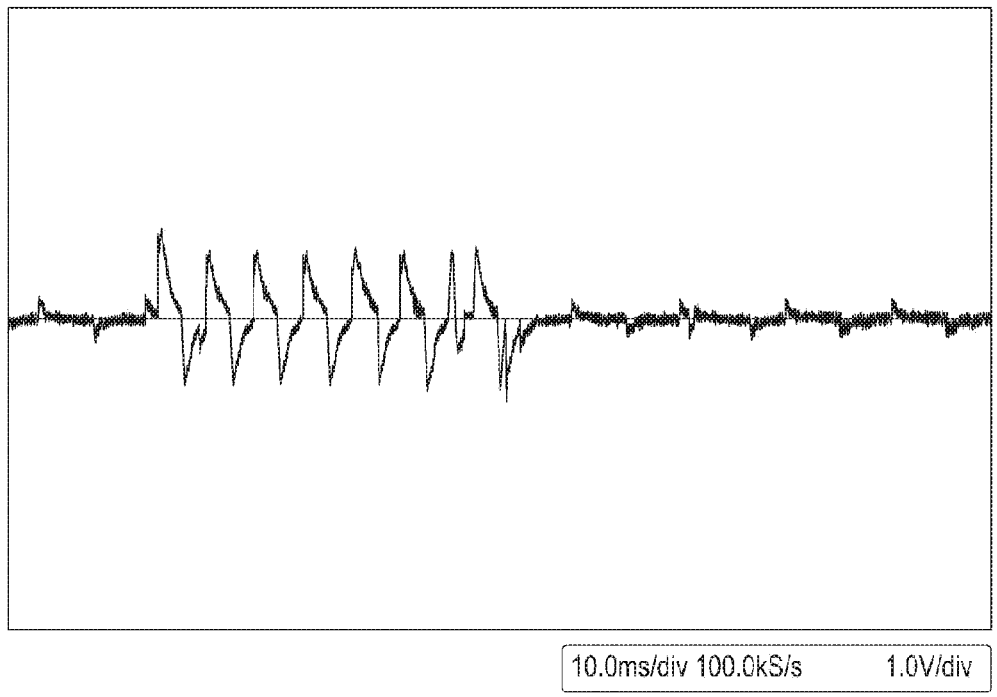
Figure 17C:
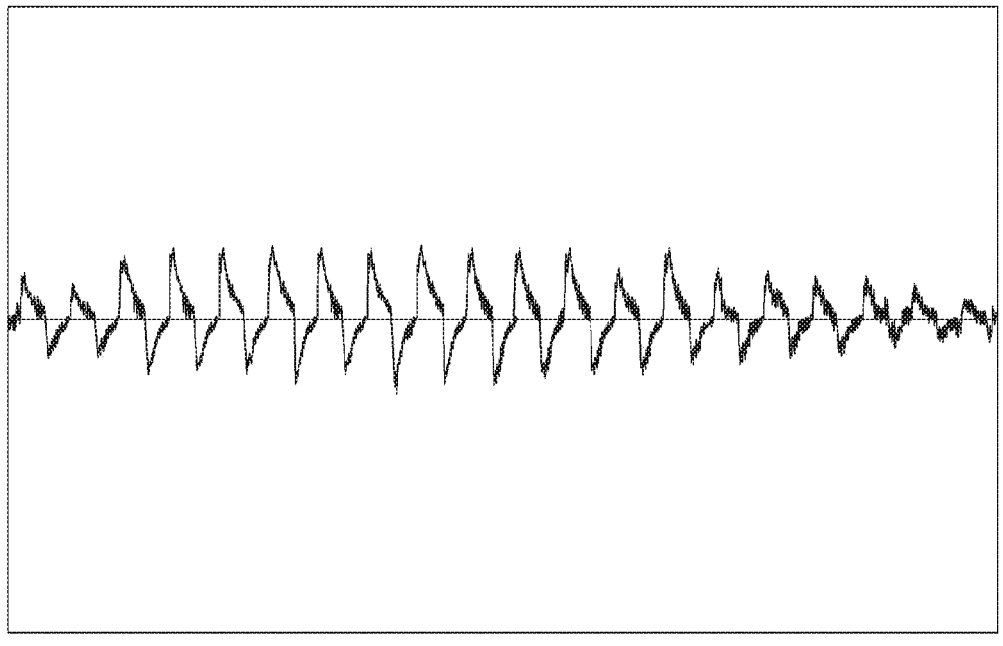
Figure 17D:
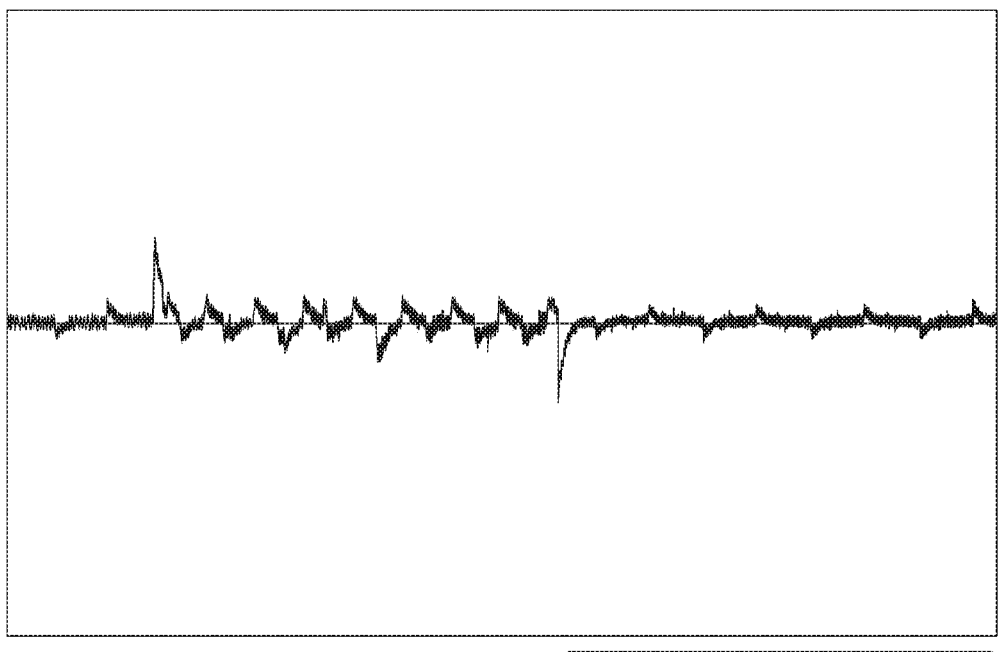
Figure 17E:
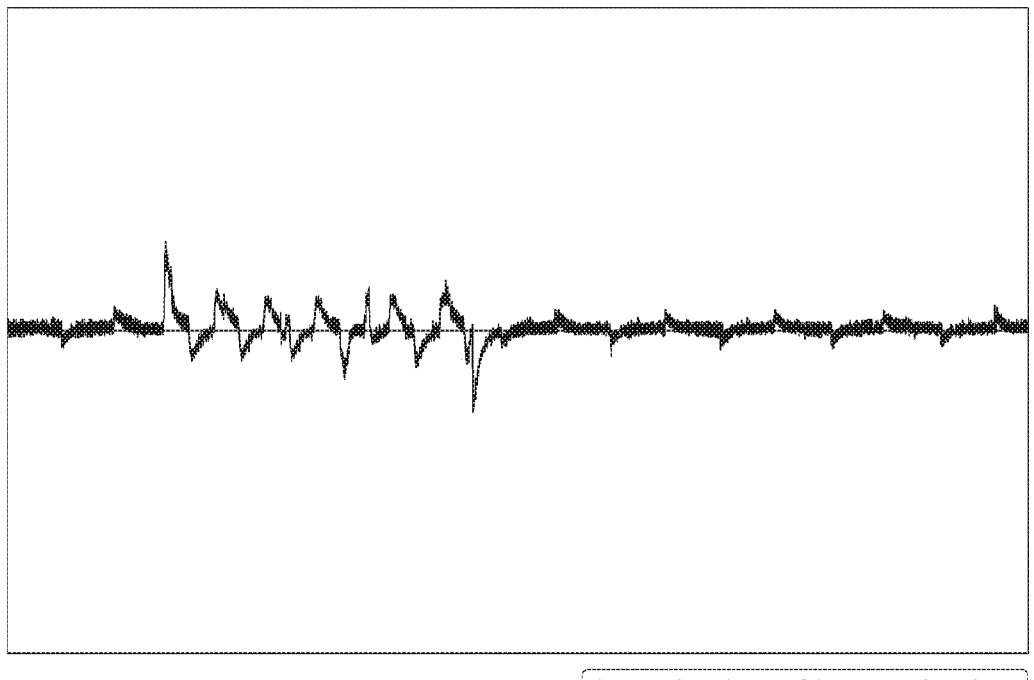
Figure 17F:
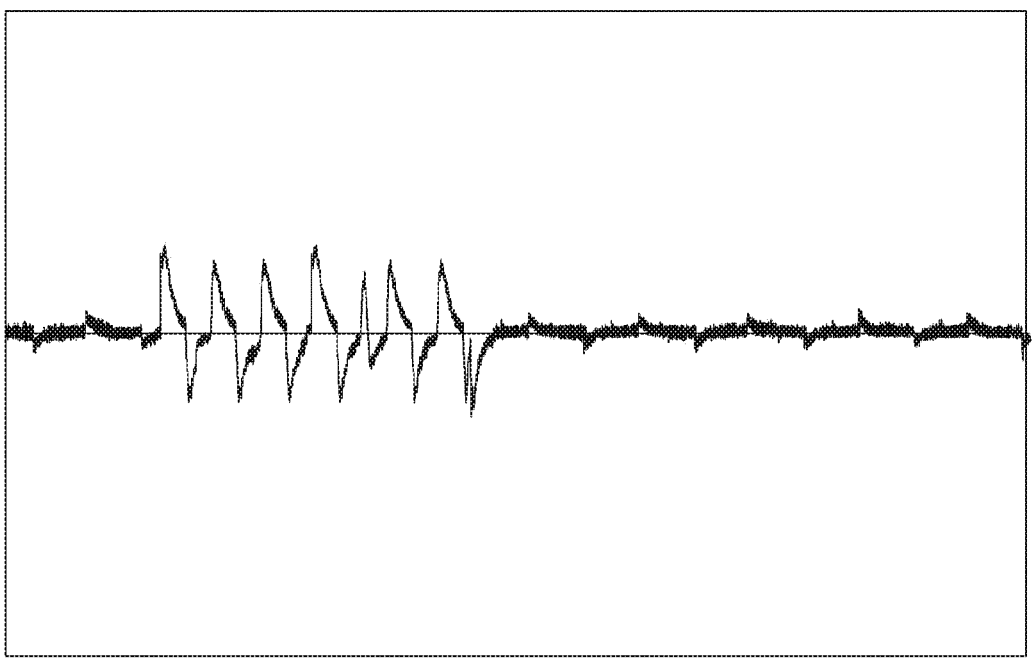
Figure 17G:
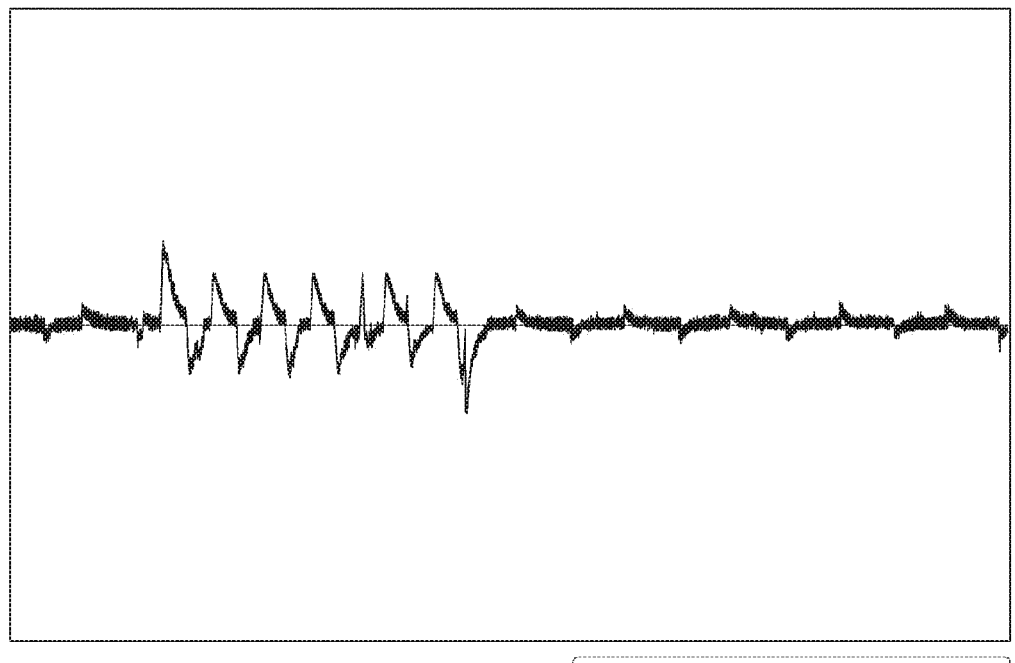
Figure 17H:
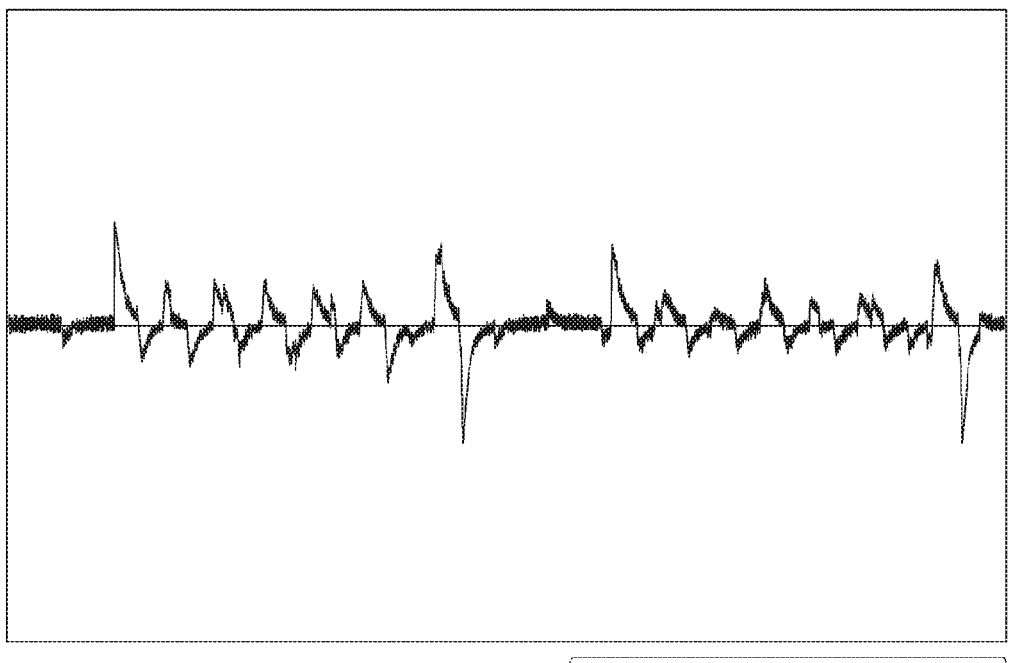
Figure 17I:
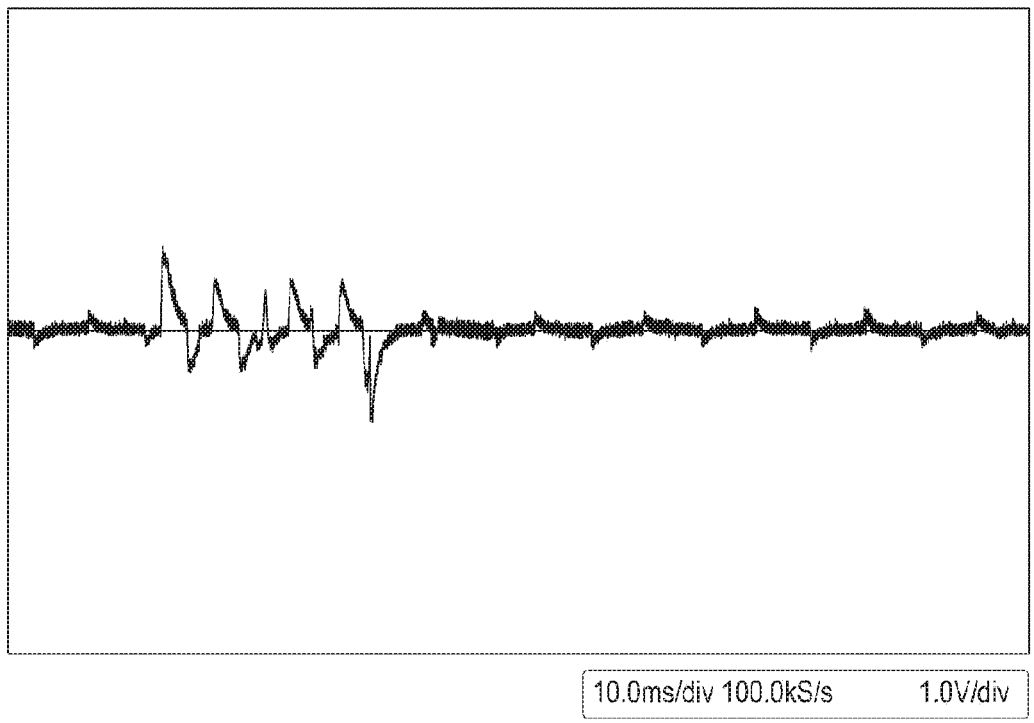

Specifically, FIG. 17A illustrates waveform results of a haptic pattern where an object is video, FIG. 17B illustrates waveform results of a haptic pattern where an object is an E-mail, FIG. 17C illustrates waveform results of a haptic pattern where an object is music, FIG. 17D illustrates waveform results of a haptic pattern where an object is an image, FIG. 17E illustrates waveform results of a haptic pattern where the number of objects is small during a scroll, FIG. 17F illustrates waveform results of a haptic pattern where the number of objects is normal during a scroll, FIG. 17G illustrates waveform results of a haptic pattern where the number of objects is large during a scroll, FIG. 17H illustrates waveform results of a haptic pattern where an object is a text message, and FIG. 17I illustrates waveform results of a haptic pattern where an object is a document.

FIGS. 17A to 17I illustrate waveforms results of haptic patterns associated with the properties of each object that the input tool 168 has analyzed by receiving a control signal from the mobile terminal 100. Specifically, the haptic controller 530 of the input tool 168 analyzes a control signal received from the mobile terminal 100 and transfers the analyzed control signal to the vibration device 520 in the input tool 168. FIGS. 17A to 17I illustrate waveform results that the haptic controller 530 has sensed and analyzed the signal applied to the vibration device 520. The input tool 168 vibrates in the waveforms of FIGS. 17A to 17I depending on the properties of the object. As illustrated in FIGS. 17A to 17I, the haptic pattern of each object, which is proposed by the present invention, may have different waveforms depending on the properties of the object. In the drawings, the horizontal axis represents the time axis in which the input tool 168 receives a control signal, while the vertical axis represents the vibration strength of the haptic pattern. One space 1730 (in FIG. 17A) of the horizontal axis is 10 ms, and one space 1740 (in FIG. 17A) of the vertical axis is 1 Volt. In FIGS. 17B to 17I, the vertical axes will be omitted for convenience.

Referring to FIG. 17A, which illustrates waveforms for a haptic pattern when an object is video, the haptic controller 530 switches the vibration device 520 to the activation mode at time 1710, vibrates the input tool 168 for about 60 ms, and then switches the vibration device 520 back to the inactivation mode at time 1720 after a lapse of 60 ms. For the 60 ms, the input tool 168 is vibrated with the vibration strength and vibration cycle associated with the haptic pattern that is determined in advance depending on the proprieties of the object. These vibration strength and vibration cycle may be set variably.

Referring to FIG. 17B, which illustrates waveforms for a haptic pattern when an object is an E-mail, the activation/inactivation cycle of the vibration device 520 in the input tool 168 is shorter than that of the video.

Referring to FIG. 17C, which illustrates waveforms for a haptic pattern when an object is music, the activation/inactivation cycle of the vibration device 520 is longer than that of the video and the vibration strength is lower at the start and end of the waveforms than in the middle of the waveforms.

Referring to FIG. 17D, which illustrates waveforms for a haptic pattern when an object is an image, the vibration strength at activation/inactivation switching of the vibration device 520 is higher than during vibration of the vibration device 520 and the vibrations have continuously occurred from the activation till the inactivation.

Referring to FIGS. 17E to 17G, which illustrate different waveforms for haptic patterns depending on the number of objects during a scroll, the haptic patterns are different depending on the remaining number of objects.

In FIG. 17H, which illustrates waveforms when an object is a text message, the input tool 168 vibrates from the activation until the inactivation of the vibration device 520, vibrates again by activating again the vibration device 520, after a lapse of a predetermined time, and then inactivates the vibration device 520.

In FIG. 17I, which illustrates waveforms when an object is a document, the vibration cycle is shorter than that of the text message.

Basically, as illustrated in FIGS. 17A to 17I, the waveforms of the haptic patterns, which are set depending on the properties of each object, are different from each other.

The above-described embodiments of the present invention may be implemented by hardware, software, or a combination thereof. The software may be stored, for example in a volatile or nonvolatile storage device such as a Read Only Memory (ROM) no matter whether it is erasable or re-writeable, or for example in a memory such as a Random Access Memory (RAM), a memory chip and a Integrated Circuit (IC) chip, or for example in storage media which is optically or magnetically recordable and readable by machine (for example, a computer), such as a Compact Disk (CD), Digital Versatile Disk (DVD), a magnetic disk and a magnetic tape. A memory that can be included in the mobile terminal may be an example of storage media that can be read by machine which is suitable to store a program or programs including instructions for implementing embodiments of the present invention. Therefore, the present invention includes programs including codes for implementing the apparatus and method defined in any claims of the specification, and machine-readable storage media storing these programs. In addition, these programs may be electrically conveyed through any media such as the communication signals which are transmitted via wired/wireless connections, and the present invention may properly include equivalents thereto.

In addition, the mobile terminal may receive and store the programs from a program server connected thereto by a wire or wirelessly. The program server may include a memory for storing programs including instructions for controlling the mobile terminal to perform the set content protection method, and information for the content protection method, a communication unit for performing wire/wireless communication with the mobile terminal, and a controller for transmitting the programs to the host device upon request of the mobile terminal or automatically.

As is apparent from the foregoing description, if an input tool is placed hovered over an object displayed on a touch screen display of a mobile terminal, the mobile terminal transmits a control signal for providing haptic effects to the input tool, while displaying a preview image on the touch screen, thereby making it possible to provide useful User Experiences (UX) for normal users and for the visually impaired. In addition, during the preview of the objects displayed on the touch screen, the mobile terminal provides haptic effects using the input tool, thereby allowing the user to feel the correct manipulation feeling when manipulating the touch screen. Additionally, the mobile terminal supports a realistic and natural user interaction environment by outputting haptic effects through the input tool.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A method for controlling feedback of an input tool for an electronic device, the method comprising:
   detecting, by the electronic device, a hovering of the input tool over a first object displayed on a touch screen of the electronic device;
   identifying a first property of the first object; and
   transmitting, to the input tool, a first control signal for feedback corresponding to the first property of the first object.

2. The method of claim 1, further comprising:
   receiving, by the input tool, the first control signal;
   generating, by the input tool, a first feedback pattern corresponding to the first control signal; and
   vibrating the input tool based on the first feedback pattern.

3. The method of claim 2, further comprising:
   detecting, by the electronic device, a movement of the input tool from the hovering over the object to a hovering over a second object having a second property;
   transmitting, to the input tool, a second control signal for feedback corresponding to the second property;
   receiving, by the input tool, the second control signal;
   generating, by the input tool, a second feedback pattern, which is different from the first feedback pattern; and
   vibrating the input tool based on the second feedback pattern.

4. The method of claim 1, further comprising storing a plurality of different feedback patterns for respective different properties of objects.

5. The method of claim 1, further comprising displaying, by the electronic device, a preview image of the first object.

6. The method of claim 1, wherein the property of the object includes at least one of a type of the first object, a number of objects, content of the first object, importance of the first object, and a genre of the first object.

7. The method of claim 1, wherein the first control signal for feedback includes at least one of vibration strength and vibration cycle of the input tool.

8. The method of claim 1, further comprising storing different feedback patterns depending on different distances between the input tool and the touch screen.

9. An electronic device for controlling feedback of an input tool, the electronic device comprising:
   a touch screen configured to display objects;
   a controller configured to detect hovering of the input tool over the touch screen, to determine a first object associated with the hovering of the input tool, and to generate a first control signal for feedback corresponding to a property of the first object; and
   a communication unit configured to transmit the first control signal to the input tool.

10. The electronic device of claim 9, wherein the controller is further configured to detect a movement of the input tool from the hovering over the first object to a hovering over a second object having a second property, and transmit, to the input tool, a second control signal for feedback corresponding to the second property.

11. The electronic device of claim 9, wherein the property of the object includes at least one of a type of the first object, a number of objects, content of the first object, importance of the first object, and a genre of the first object.

12. The electronic device of claim 9, wherein the first control signal includes at least one of vibration strength and vibration cycle of the input tool.

13. The electronic device of claim 9, wherein the first control signal includes at least one of activation information of a vibration unit of the input tool, inactivation information of the vibration unit, and information indicating vibration strength of the vibration unit.

14. The electronic device of claim 9, wherein the controller is further configured to control vibration of the electronic device in response to at least one of a vibration cycle and a vibration strength, which are included in the first control signal.

15. A method for providing feedback of an input tool of an electronic device, the method comprising:
   storing, by the electronic device, different feedback patterns for different properties of objects;
   detecting the input tool hovering over an object displayed by the electronic device;
   determining properties of the object;
   displaying a preview image including at least one of details of the object, metadata for the object, and a zoomed image of the object; and
   controlling vibration of the electronic device depending on a feedback pattern that is set for the object.

16. The method of claim 15, further comprising:
   generating a control signal associated with the feedback pattern that is set for the object; and
   transmitting the control signal to the input tool.

17. An input tool comprising:
   a vibration unit;
   a short-range communication unit configured to receive a control signal from an electronic device, in response to the input tool hovering over the electronic device; and
   a controller configured to control the vibration unit based on the control signal,
   wherein the control signal controls at least one of activation of the vibration unit, inactivation of the vibration unit, a vibration cycle of the vibration unit, and a vibration strength of the vibration unit, depending on a property of an object displayed on the electronic device over which the hovering is detected.

18. The input tool of claim 17, further comprising a coil configured to generate an induced magnetic field.

19. The input tool of claim 17, further comprising a speaker configured to output a sound that corresponds to at least one of the vibration cycle and the vibration strength of the vibration unit.

20. The input tool of claim 17, wherein the controller is further configured to activate the vibration unit if the hovering occurs, and to inactivate the vibration unit if the hovering is terminated.

* * * * *